US010481516B2

(12) United States Patent
Kinuta et al.

(10) Patent No.: US 10,481,516 B2
(45) Date of Patent: Nov. 19, 2019

(54) CHARGING MEMBER, CHARGING DEVICE, PROCESS CARTRIDGE, AND IMAGE FORMING APPARATUS

(71) Applicant: FUJI XEROX CO., LTD., Tokyo (JP)

(72) Inventors: Yasuhiko Kinuta, Kanagawa (JP); Yuki Tagawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/105,317

(22) Filed: Aug. 20, 2018

(65) Prior Publication Data

US 2019/0294073 A1 Sep. 26, 2019

(30) Foreign Application Priority Data

Mar. 20, 2018 (JP) ................................ 2018-053052
Mar. 20, 2018 (JP) ................................ 2018-053071

(51) Int. Cl.
*G03B 15/02* (2006.01)
*G03G 15/02* (2006.01)
*G03G 21/18* (2006.01)

(52) U.S. Cl.
CPC ..... *G03G 15/0233* (2013.01); *G03G 21/1814* (2013.01)

(58) Field of Classification Search
CPC ............... G03G 15/02; G03G 15/0233; G03G 21/1814; G03G 2215/21
USPC ................ 399/107, 110, 111, 115, 168, 176; 492/48, 53, 56
See application file for complete search history.

(56) References Cited

U.S. PATENT DOCUMENTS 10,175,599 B2 * 1/2019 Nonaka .............. G03G 15/0233
2017/0168404 A1 * 6/2017 Suzuki ..................... G03G 5/04

FOREIGN PATENT DOCUMENTS

JP 2016-141128 A 8/2016

* cited by examiner

*Primary Examiner* — Hoan H Tran
(74) *Attorney, Agent, or Firm* — Sughrue Mion, PLLC

(57) ABSTRACT

A charging member includes: a cylindrical or columnar conductive base material; and an elastic portion provided on the conductive base material, in which Re and Rc satisfy Re>Rc, where Re is an outer diameter of a charging member at a position of 5 mm from an axial end portion of an elastic portion, and Rc is the maximum value of an outer diameter of the charging member at an axial center of the elastic portion, and a cylindrical or columnar charging member has a value of Ac/Aa of 1.0 or less, in which Ac is the maximum amplitude value in a periodic region from 1.5 mm to 6 mm in a case of periodically analyzing a surface shape of the charging member in a circumferential direction, and Aa is the maximum amplitude value in a periodic region from 1.5 mm to 6 mm in a case of periodically analyzing a surface shape of the charging member in an axial direction.

22 Claims, 8 Drawing Sheets

CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2018-053052 filed Mar. 20, 2018, and Japanese Patent Application No. 2018-053071 filed Mar. 20, 2018.

BACKGROUND

(i) Technical Field

The present invention relates to a charging member, a charging device, a process cartridge, and an image forming apparatus.

(ii) Related Art

In an image forming apparatus utilizing an electrophotographic method, first, a surface of an image holding member including a photoconductive photoreceptor made of an inorganic or organic material is charged using a charging device to form a latent image. Thereafter, the latent image is developed with a charged toner to form a visualized toner image. Then, the toner image is transferred via an intermediate transfer member or directly onto a recording medium such as recording sheet, and is fixed on the recording medium to form a target image.

As a producing method for a charging member such as a charging roll which is provided in a charging device, the following proposal has been made.

For example, JP-A-2016-141128 discloses a producing method for a rubber roll which includes a first step of covering an outer peripheral surface of a core metal with a rubber material, in which the rubber material is extruded into a cylindrical shape from an extruding section under an extrusion condition such that W/V, which is a ratio of an extrusion amount V (g/min) of the rubber material extruded per minute from the extruding section while the core metal is not supplied from a core metal supplying section, and a filling amount W (g) of the rubber material in a second compression region, is 1.5 to 4.0, and the core metal is supplied from the core metal supplying section to a center portion of the rubber material extruded into a cylindrical shape, and a second step of carrying out a vulcanization treatment with respect to the rubber material covering the outer peripheral surface of the core metal.

SUMMARY

Aspects of non-limiting embodiments of the present disclosure relate to a charging member in which generation of density unevenness in an obtained image is prevented as compared with a case where Re and Rc satisfy $Re \leq Rc$ in which Re is an outer diameter of the charging member at a position of 5 mm from an axial end portion of an elastic portion, and Rc is the maximum value of an outer diameter of the charging member at an axial center of the elastic portion, which is hereinafter referred to as a first aspect.

Aspects of non-limiting embodiments of the present disclosure relate to a charging member in which generation of density unevenness in an obtained image is prevented as compared with a case where a value of Ac/Aa is greater than 1.0 in which Ac is the maximum amplitude value in a periodic region from 1.5 mm to 6 mm in a case of periodically analyzing a surface shape of the charging member in a circumferential direction, and Aa is the maximum amplitude value in a periodic region from 1.5 mm to 6 mm in a case of periodically analyzing the surface shape of the charging member in an axial direction, which is hereinafter referred to as a second aspect.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to the first aspect of the present disclosure, there is provided a charging member including: a cylindrical or columnar conductive base material; and an elastic portion provided on the conductive base material, in which Re and Rc satisfy $Re > Rc$, where Re is an outer diameter of a charging member at a position of 5 mm from an axial end portion of the elastic portion, and Rc is a maximum value of an outer diameter of the charging member at an axial center of the elastic portion.

According to the second aspect of the present disclosure, there is provided a cylindrical or columnar charging member, having a value of Ac/Aa of 1.0 or less, in which Ac is a maximum amplitude value in a periodic region from 1.5 mm to 6 mm in a case of periodically analyzing a surface shape of the charging member in a circumferential direction, and Aa is a maximum amplitude value in a periodic region from 1.5 mm to 6 mm in a case of periodically analyzing a surface shape of the charging member in an axial direction.

BRIEF DESCRIPTION OF THE DRAWINGS

Exemplary embodiments of the present invention will be described in detail based on the following figures, wherein.

DETAILED DESCRIPTION

Hereinafter, Embodiment X according to the first aspect will be described.

[Charging Member]

The charging member according to Embodiment X includes a cylindrical or columnar conductive base material, and an elastic portion provided on the conductive base material, in which Re and Rc satisfy Re>Rc, where Re is an outer diameter of a charging member at a position of 5 mm from an axial end portion of the elastic portion, and Rc is the maximum value of an outer diameter of the charging member at an axial center of the elastic portion.

The charging member according to Embodiment X is, for example, a charging member which is disposed in contact with a member to be charged (for example, an image holding member) and contact charges the member to be charged by being applied with a voltage.

In this specification, conductivity means that a volume resistivity at 20° C. is $1\times10^{14}$ Ωcm or less.

The image holding member vibrates as the charging member disposed in contact with a surface of the image holding member rotates. In a case where the image holding member vibrates, a forming position (writing position) of a latent image formed by an exposing device may change, and generation of density unevenness in an image may occur. In particular, in a case where the image holding member, the charging member, and the exposing device using a light emitting diode as a light source are integrally kept in a housing, vibration due to the charging member also propagates through the housing to the exposing device, and the forming position (writing position) of the latent image formed by the exposing device changes, so that generation of density unevenness in an image easily occurs.

In view of the above, the charging member according to Embodiment X is a charging member in which Re and Rc satisfy Re>Rc, where Re is an outer diameter of a charging member at a position of 5 mm from an axial end portion of an elastic portion, and Rc is the maximum value of an outer diameter of the charging member at an axial center of the elastic portion. It is presumed that vibration of the image holding member caused by rotation of the charging member is prevented by increasing a thickness of a portion in the vicinity of the axial end portion which makes many contacts with the image holding member in the axial direction of the elastic portion, and thus changes in the forming position (writing position) of the latent image formed by the exposing device are prevented.

Therefore, it is presumed that by preventing changes in the forming position (writing position) of the latent image formed by the exposing device, it is possible to obtain a charging member in which generation of density unevenness in an obtained image is prevented.

Hereinafter, the charging member according to Embodiment X will be described with reference to the drawings.

Figure 1:
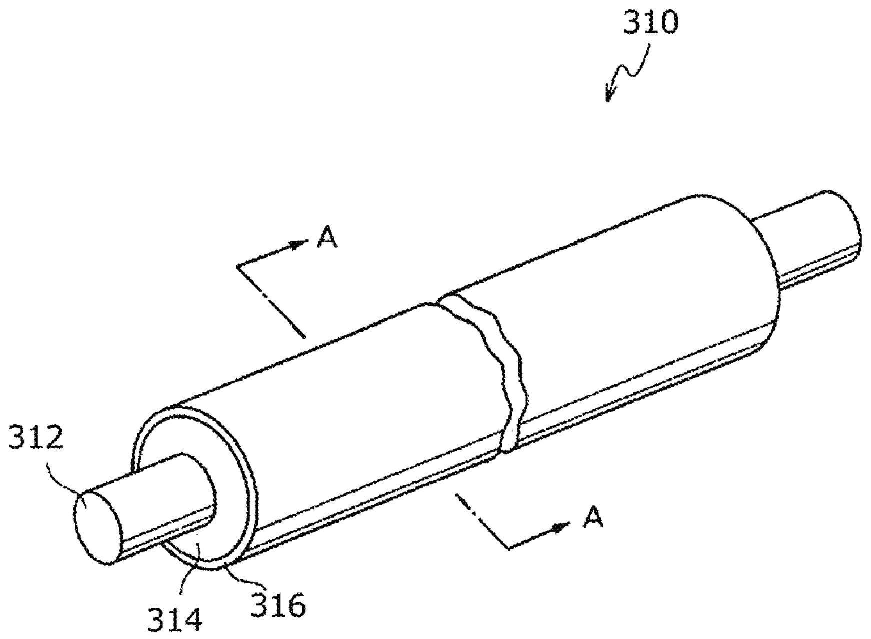
FIG. 1 is a schematic perspective view showing a charging member according to the present exemplary embodiment.
Figure 2:
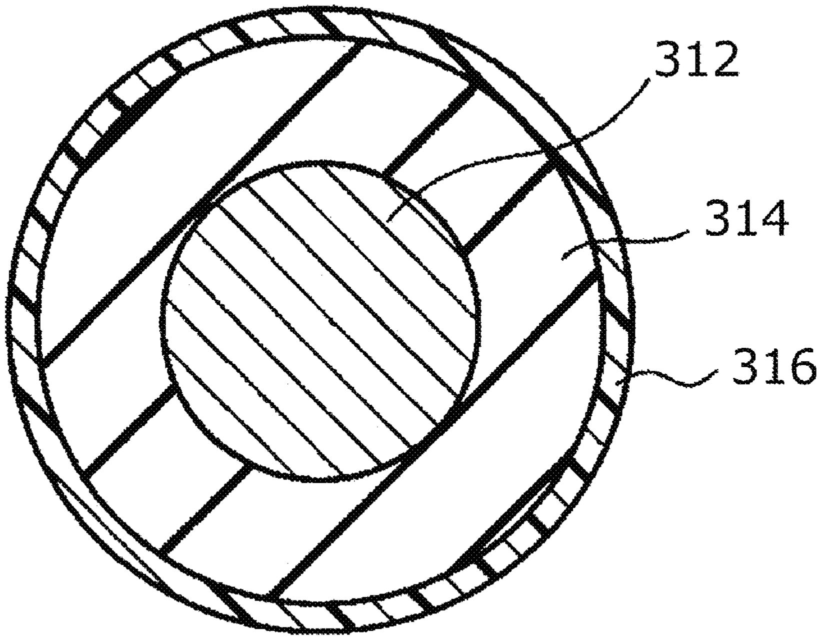
FIG. 2 is a schematic cross-sectional view of the charging member according to the present exemplary embodiment.

FIG. 1 is a schematic perspective view showing a charging member according to Embodiment X. FIG. 2 is a schematic cross-sectional view of the charging member according to Embodiment X. FIG. 2 is a cross-sectional view taken along a line A-A in FIG. 1.

As shown in FIGS. 1 and 2, a charging member 310 according to Embodiment X is, for example, a roll member that includes a cylindrical or columnar conductive base material 312 (shaft), an elastic layer 314 disposed on an outer peripheral surface of the conductive base material 312, and a surface layer 316 disposed on an outer peripheral surface of the elastic layer 314.

It is sufficient that the elastic portion in Embodiment X is an elastic portion having at least the elastic layer 314. The surface layer 316 may be provided on a surface of the elastic layer 314.

Among these, the elastic portion preferably has the elastic layer 314 and the surface layer 316.

The charging member 310 according to Embodiment X is not limited to the configuration described above, and, for example, a mode in which the surface layer 316 is not provided, that is, a mode in which the charging member 310 according to Embodiment X is configured to have the conductive base material 312 and the elastic layer 314 may be adopted.

In addition, a mode in which the charging member 310 further includes an intermediate layer (for example, an adhesive layer) disposed between the elastic layer 314 and the conductive base material 312, and a resistance controlling layer or a transition preventing layer disposed between the elastic layer 314 and the surface layer 316 may be adopted.

Hereinafter, details of the charging member 310 according to Embodiment X will be described. It should be noted that description will be made with reference numerals being omitted.

In the charging member according to Embodiment X, Re and Rc satisfy Re>Rc, where Re is an outer diameter of a charging member at a position of 5 mm from an axial end portion of an elastic portion, and Rc is the maximum value of an outer diameter of the charging member at an axial center of the elastic portion.

There are two positions of 5 mm from the axial end portion of the elastic portion. However, it is sufficient to satisfy Re>Rc at at least one position, and, from the viewpoint of preventing generation of density unevenness in an image, it is preferable to satisfy Re>Rc at both of the two positions of 5 mm from the respective end portions.

In addition, from the viewpoint of preventing generation of density unevenness in an image, a difference between a value of Re and a value of Rc is preferably 0.05 mm or more, more preferably 0.05 mm to 0.5 mm, even more preferably 0.10 mm to 0.5 mm, and particularly preferably 0.25 mm to 0.5 mm.

Furthermore, from the viewpoint of preventing generation of density unevenness in an image, in the charging member according to Embodiment X, it is preferable that Re1 and Rc satisfy Re1>Rc, where Re1 is an average outer diameter of the charging member in a range from the axial end portion of the elastic portion to 5 mm therefrom, and Rc is the maximum value of the outer diameter of the charging member at the axial center of the elastic portion, and, in the charging member according to Embodiment X, it is more preferable that Re2 and Rc satisfy Re2>Rc, where Re2 is an average outer diameter of the charging member in a range from the axial end portion of the elastic portion to 10 mm therefrom, and Rc is the maximum value of the outer diameter of the charging member at the axial center of the elastic portion.

In a case of periodically analyzing a surface shape of the elastic portion in a circumferential direction, a value of the maximum amplitude value Acc at an axial center of the elastic portion in a periodic region from 1.5 mm to 6 mm is preferably 0.4 μm or more, more preferably 0.4 μm to 1.0 μm, and particularly preferably 0.6 μm to 0.8 μm, from the viewpoint of preventing generation of density unevenness in an image.

In a case of periodically analyzing a surface shape of the elastic portion in a circumferential direction, a value of the maximum amplitude value Ae at a position of 5 mm from an axial end portion of the elastic portion in a periodic region from 1.5 mm to 6 mm is preferably 0.4 μm or more, more preferably 0.4 μm to 0.8 μm, even more preferably 0.4 μm to 0.7 μm, and particularly preferably 0.4 μm to 0.6 μm, from the viewpoint of preventing generation of density unevenness in an image.

In a case of periodically analyzing a surface shape of the elastic portion in a circumferential direction, a value of Ae/Acc, which is a ratio of the maximum amplitude value Ae at a position of 5 mm from an axial end portion of the elastic portion in a periodic region from 1.5 mm to 6 mm and the maximum amplitude value Acc at an axial center of the elastic portion in a periodic region from 1.5 mm to 6 mm, is preferably 1.0 or less, more preferably 0.9 or less, even more preferably 0.8 or less, and particularly preferably 0.6 to 0.8, from the viewpoint of preventing generation of density unevenness in an image.

A periodic analysis in a circumferential direction on the surface shape of the elastic portion in the charging member according to Embodiment X is carried out by the following method.

First, a circularity-cylindrical shape measuring machine is used to measure an outer shape at an axial center of the elastic portion of the charging member and an outer shape at a position of 5 mm from an axial end portion of the elastic portion. As a result, an amplitude of a cross-sectional outer shape of the charging member is obtained. A measurement condition for the cross-sectional outer shape of the charging member is as follows.

Circularity•cylindrical shape measuring machine: Model: RondCom 60A, manufactured by TOKYO SEIMITSU CO., LTD.

Detector: Low-pressure detector for RondCom 60A (model: E-DT-R87A, manufactured by TOKYO SEIMITSU CO., LTD.)

Wavy shape measuring probe: Wavy shape measuring probe for RondCom 60A (model: 0102505, manufactured by TOKYO SEIMITSU CO., LTD.)

Measurement magnification: 500 times

Measurement speed: 4/min

Core method: LSC

Filter: 2RC

Cutoff: Low

Data extraction pitch: every 0.1

Next, after measuring the cross-sectional outer shape of the charging member, for each cross section, amplitudes of the obtained cross-sectional outer shape of the charging member are connected for 5 periods, and continuous data of 16,384 points therein are used to carry out a periodic analysis by Fast Fourier Transform (FFT). As for an amplitude value of each period of the charging member, a value obtained by averaging amplitude values obtained in each cross section for each period is adopted.

Then, the maximum amplitude value in a periodic region from 1.5 mm to 6 mm in a case of periodically analyzing the surface shape of the elastic portion in the circumferential direction is obtained.

Surface shape characteristics of the elastic portion of the charging member are controlled depending on a condition for a producing method for a charging member (for example, a forming method for an elastic layer and a forming method for a surface layer) as described later.

As a method of adjusting the elastic portion to satisfy Re>Rc in which Re is an outer diameter of a charging member at a position of 5 mm from an axial end portion of an elastic portion, and Rc is the maximum value of an outer diameter of the charging member at an axial center of the elastic portion, for example, a method of decreasing a thickness of an axial center part of the elastic layer in the elastic portion, such as reducing a coating amount or cutting the center portion, a method of increasing a thickness of the elastic layer in the vicinity of the axial end portion in the elastic portion, such as increasing a coating amount, and a method of forming a thick surface layer in the vicinity of the axial end portion in the elastic portion are mentioned.

Hereinafter, Embodiment A according to the second aspect will be described.

[Charging Member]

The charging member according to Embodiment A is a cylindrical or columnar charging member which has a value of Ac/Aa of 1.0 or less, where Ac is the maximum amplitude value in a periodic region from 1.5 mm to 6 mm in a case of periodically analyzing a surface shape of the charging member in a circumferential direction, and Aa is the maximum amplitude value in a periodic region from 1.5 mm to 6 mm in a case of periodically analyzing a surface shape of the charging member in an axial direction.

The charging member according to Embodiment A is, for example, a charging member which is disposed in contact with a member to be charged (for example, an image holding member) and contact charges the member to be charged by being applied with a voltage.

In this specification, conductivity means that a volume resistivity at 20° C. is $1\times10^{14}$ Ωcm or less.

Here, in a case where the charging member disposed in contact with the surface of the image holding member has a poor surface shape in a circumferential direction, the image holding member vibrates as the charging member rotates. In a case where the image holding member vibrates, a forming position (writing position) of a latent image formed by an exposing device may change, and generation of density unevenness in the image may occur. In particular, in a case where the image holding member, the charging member, and the exposing device using a light emitting diode as a light source are integrally kept in a housing, vibration due to the charging member also propagates through the housing to the exposing device, and the forming position (writing position) of the latent image formed by the exposing device changes, so that generation of density unevenness in an image easily occurs.

In the charging member of Embodiment A, vibration of the image holding member caused by rotation of the charging member is prevented by setting the value of Ac/Aa to be 1.0 or less, where Ac is the maximum amplitude value in a periodic region from 1.5 mm to 6 mm in a case of periodically analyzing a surface shape of the charging member in a circumferential direction, and Aa is the maximum amplitude value in a periodic region from 1.5 mm to 6 mm in a case of periodically analyzing a surface shape of the charging member in an axial direction. As a result, the vibration of the image holding member caused by the rotation of the charging member relaxes vibration of the image holding member caused by a member other than the charging member, and influence of the vibration caused by the member other than the charging member on the image holding member is prevented.

In a similar manner, even in a case where the image holding member, the charging member, and the exposing device using a light emitting diode as a light source are integrally kept in a housing, vibration of the exposing device caused by the rotation of the charging member is prevented, and, on the other hand, influence of vibration caused by a member other than the charging member on the exposing device is prevented.

Therefore, the charging member according to Embodiment A prevents changes of the forming position (writing position) of the latent image formed by the exposing device. As a result, generation of density unevenness in an image is prevented.

Hereinafter, the charging member according to Embodiment A will be described with reference to the drawings.

FIG. 1 is a schematic perspective view showing the charging member according to Embodiment A. FIG. 2 is a schematic cross-sectional view of the charging member according to Embodiment A. FIG. 2 is a cross-sectional view taken along a line A-A in FIG. 1.

As shown in FIGS. 1 and 2, a charging member 310 according to Embodiment A is, for example, a roll member that includes a cylindrical or columnar conductive base material 312 (shaft), an elastic layer 314 disposed on an outer peripheral surface of the conductive base material 312, and a surface layer 316 disposed on an outer peripheral surface of the elastic layer 314.

The charging member 310 according to Embodiment A is not limited to the configuration described above, and, for example, a mode in which the surface layer 316 is not provided, that is, a mode in which the charging member 310 according to Embodiment A is configured to have the conductive base material 312 and the elastic layer 314 may be adopted.

In addition, a mode in which the charging member 310 further includes an intermediate layer (for example, an adhesive layer) disposed between the elastic layer 314 and the conductive base material 312, and a resistance controlling layer or a transition preventing layer disposed between the elastic layer 314 and the surface layer 316 may be adopted.

Hereinafter, details of the charging member 310 according to Embodiment A will be described. It should be noted that description will be made with reference numerals being omitted.

In the charging member according to Embodiment A, a value of Ac/Aa is 1.0 or less, where Ac is the maximum amplitude value in a periodic region from 1.5 mm to 6 mm in a case of periodically analyzing a surface shape of the charging member in a circumferential direction, and Aa is the maximum amplitude value in a periodic region from 1.5 mm to 6 mm in a case of periodically analyzing a surface shape of the charging member in an axial direction, and, from the viewpoint of preventing generation of density unevenness in an image, the value of Ac/Aa is preferably less than 1.0, more preferably 0.9 or less, even more preferably 0.8 or less, and particularly preferably 0.4 to 0.8.

A value of Ac which is the maximum amplitude value in a periodic region from 1.5 mm to 6 mm in a case of periodically analyzing a surface shape of the charging member in a circumferential direction is preferably 0.2 μm to 1.0 μm, more preferably 0.3 μm to 0.9 μm, even more preferably 0.4 μm to 0.8 μm, and particularly preferably 0.5 μm to 0.8 μm, from the viewpoint of preventing generation of density unevenness in an image.

A value of Aa which is the maximum amplitude value in a periodic region from 1.5 mm to 6 mm in a case of periodically analyzing a surface shape of the charging member in an axial direction is preferably 0.3 μm to 1.1 μm, more preferably 0.5 μm to 1.1 μm, even more preferably 0.7 μm to 1.0 μm, and particularly preferably 0.8 μm to 1.0 μm, from the viewpoint of preventing generation of density unevenness in an image.

A periodic analysis on the surface shape of the charging member in a circumferential direction is carried out by the following method.

First, by using a circularity•cylindrical shape measuring machine, outer shapes of nine cross sections of the charging member (cross sections cut in a direction perpendicular to the axial direction of the charging member) are measured at an interval obtained by equally dividing the entire length (entire length=axial length of the charging member) of the elastic layer of the charging member into nine parts. As a result, an amplitude of the cross-sectional outer shape of the charging member is obtained. A measurement condition for the cross-sectional outer shape of the charging member is as follows.

Circularity•cylindrical shape measuring machine: Model: RondCom 60A, manufactured by TOKYO SEIMITSU CO., LTD.

Detector: Low-pressure detector for RondCom 60A (model: E-DT-R87A, manufactured by TOKYO SEIMITSU CO., LTD.)

Wavy shape measuring probe: Wavy shape measuring probe for RondCom 60A (model: 0102505, manufactured by TOKYO SEIMITSU CO., LTD.)

Measurement magnification: 500 times

Measurement speed: 4/min

Core method: LSC

Filter: 2RC

Cutoff: Low

Data extraction pitch: every 0.1°

Next, after measuring the cross-sectional outer shape of the charging member, amplitudes of the obtained cross-sectional outer shape of the charging member are connected for 5 periods, and continuous data of 16,384 points therein are used to carry out a periodic analysis by Fast Fourier Transform (FFT). As for an amplitude value of each period of the charging member, a value obtained by averaging amplitude values obtained in the respective nine cross sections for each period is adopted.

Then, the maximum amplitude value in a periodic region from 1.5 mm to 6 mm in a case of periodically analyzing the surface shape of the charging member in the circumferential direction is obtained.

Surface shape characteristics of the charging member are controlled depending on a condition for a producing method for a charging member (for example, a forming method for an elastic layer and a forming method for a surface layer) as described later.

In the charging member, there is no particular limitation on a method of satisfying the value of Ac/Aa. For example, a method of applying a periodic change to a core metal feeding speed so that amplitudes in the circumferential direction and the axial direction are changed by superimposition of an amplitude with respect to rotational driving of a core metal feed roll, and the like are mentioned. In addition, an amount of change in the amplitude is also adjusted by adjusting a temperature of an extruder.

Hereinafter, details of the respective members of the charging members according to Embodiments X and A will be described. Unless otherwise specified, the descriptions are applied to both exemplary embodiments X and A.

(Conductive Base Material)

The conductive base material will be described.

As the conductive base material, for example, one constituted by a conductive material such as a metal or an alloy such as aluminum, a copper alloy, and stainless steel; iron plated with chromium, nickel, or the like; or a conductive resin is used.

The conductive base material functions as an electrode and a support member of a charging roll, and, for example, as a material constituting the same, a metal such as iron (such as free-cutting steel), copper, brass, stainless steel, aluminum, and nickel is mentioned. Examples of the conductive base material include a member (for example, a resin or a ceramic member) of which an outer peripheral surface is plated, and a member (for example, a resin or a ceramic member) in which a conductive material is dispersed. The conductive base material may be a hollow member (cylindrical member) or a non-hollow member.

(Elastic Portion)

In the present exemplary embodiment, the elastic portion preferably has at least the elastic layer, and more preferably has at least the elastic layer and the surface layer from the viewpoint of preventing generation of density unevenness in an image and easily adjusting the value of Re and the value of Rc.

As a method of satisfying Re>Rc, for example, a method of decreasing a thickness of an axial center part of the elastic layer in the elastic portion, a method of forming a thick surface layer in the vicinity of an axial end portion in the elastic portion, such as increasing a coating amount, and the like are mentioned. Among these, as the elastic portion, a mode in which the surface layer in a range from the axial end portion in the elastic portion to at least 5 mm therefrom is formed to be thicker than the surface layer at the axial center in the elastic portion is preferably mentioned.

—Elastic Layer—

The elastic layer will be described.

The elastic layer is, for example, a conductive layer including an elastic material and a conductive material. The elastic layer may contain other additives as necessary.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene ternary copolymer rubber (EPDM), acrylonitrile-butadiene copolymer rubber (NBR), natural rubber, and mixed rubber thereof. Among these, as the elastic material, polyurethane, silicone rubber, EPDM, epichlorohydrin-ethylene oxide copolymer rubber, epichlorohydrin-ethylene oxide-allyl glycidyl ether copolymer rubber, NBR, mixed rubber thereof, and the like are preferably mentioned. These elastic materials may be foamed or non-foamed.

Examples of the conductive material include an electron conductive material and an ion conductive material.

Examples of the electron conductive material include powders of carbon black such as Ketjen black and acetylene black; pyrolytic carbon, graphite; various conductive metals or alloys such as aluminum, copper, nickel, and stainless steel; various conductive metal oxides such as tin oxide, indium oxide, titanium oxide, tin oxide-antimony oxide solid solution, and tin oxide-indium oxide solid solution; ones obtained by carrying out conducting treatment of surfaces of insulating materials; and the like.

In addition, examples of the ion conductive material include perchlorates, chlorates, and the like of tetraethylammonium, lauryltrimethylammonium or the like; perchlorates, chlorates, and the like of alkali metals such as lithium and magnesium, or alkaline earth metals.

These conductive materials may be used alone, or two or more thereof may be used in combination.

Here, specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", "COLOR BLACK FW2V" (all manufactured by Orion Engineered Carbons), "MONARCH 1000", "MONARCH 1300", "MONARCH 1400", "MOGUL-L", "REGAL 400R" (all manufactured by Cabot Corporation), and the like.

An average particle diameter of these conductive materials is preferably 1 nm to 200 nm.

The average particle diameter is calculated by observing with an electron microscope using a sample obtained by cutting the elastic layer, measuring 100 diameters (maximum diameters) of the conductive materials, and averaging them. In addition, the average particle diameter may be measured using, for example, ZETA SIZER NANO ZS manufactured by SYSMEX CORPORATION.

A content of the conductive material is not particularly limited, and, in a case of the electron conductive material, the content is preferably from 1 part by weight to 30 parts by weight, and more preferably from 15 parts by weight to 25 parts by weight, with respect to 100 parts by weight of the elastic material. On the other hand, in a case of the ion conductive material, a content thereof is preferably from 0.1 parts by weight to 5.0 parts by weight, and more preferably 0.5 parts by weight to 3.0 parts by weight, with respect to 100 parts by weight of the elastic material.

Examples of other additives blended in the elastic layer include materials which may be usually added to the elastic layer such as softeners, plasticizers, curing agents, vulcanizing agents, vulcanization accelerators, antioxidants, surfactants, coupling agents, and filling agents (silica, calcium carbonate, and the like).

A thickness of the elastic layer is preferably 1 mm to 10 mm, and more preferably 2 mm to 5 mm.

A volume resistivity of the elastic layer is preferably $10^3$ Ωcm to $10^{14}$ Ωcm.

The volume resistivity of the elastic layer is a value measured by the following method.

A sheet-shaped measurement sample is taken from the elastic layer. With respect to the measurement sample, in accordance with JIS K 6911 (1995), a measurement jig (R12702A/B resistivity•chamber: manufactured by ADVANTEST CORPORATION) and a high-resistance measuring instrument (R8340A digital high-resistance/micro-ammeter: manufactured by ADVANTEST CORPORATION) are used to apply a voltage, which is regulated so that an electric field (applied voltage/thickness of composition sheet) is 1000 V/cm, for 30 seconds. Thereafter, the volume resistivity is calculated from the flowing current value using the following equation.

$$\text{Volume resistivity } (\Omega\text{cm}) = (19.63 \times \text{applied voltage (V)}) / (\text{current value (A)} \times \text{thickness of measurement sample (cm)})$$

—Surface Layer—

The surface layer is, for example, a layer containing a resin. The surface layer may contain other additives and the like as necessary.

Here, the surface layer may be in a mode in which a resin layer or the like is independently provided on the elastic layer, or in a mode in which air bubbles in a skin layer portion of a foamed elastic layer are impregnated with a resin or the like (that is, a mode in which a skin layer portion of the elastic layer in which bubbles are impregnated with the resin or the like is used as the surface layer).

—Resin—

Examples of the resin include acrylic resin, fluorine-modified acrylic resin, silicone-modified acrylic resin, cellulose resin, polyamide resin, copolyamide, polyurethane resin, polycarbonate resin, polyester resin, polyimide resin, epoxy resin, silicone resin, polyvinyl alcohol resin, polyvinyl butyral resin, polyvinyl acetal resin, ethylene tetrafluoroethylene resin, melamine resin, polyethylene resin, polyvinyl resin, polyarylate resin, and polythiophene resin. Polyethylene terephthalate resin (PET), fluororesin (polyvinylidene fluoride resin, tetrafluoroethylene resin, tetrafluoroethylene-perfluoroalkyl vinyl ether copolymer (PFA), tetrafluoroethylene-hexafluoropropylene copolymer (FEP), and the like) are mentioned. In addition, the resin is preferably one obtained by curing or crosslinking a curable resin with a curing agent or a catalyst.

Here, the copolyamide is a copolymer which contains one or more of 610 nylon, 11 nylon, and 12 nylon as a polymerization unit. The copolyamide may contain another polymerization unit such as 6 nylon and 66 nylon.

Among these, as the resin, from the viewpoint of preventing toner scatter of the surface layer, polyvinylidene fluoride resin, tetrafluoroethylene resin, or polyamide resin is preferable, and polyamide resin is more preferably mentioned. The polyamide resin hardly causes triboelectric charging due to contact with a member to be charged (for example, an image holding member), and easily prevents adhesion of a toner and external additives.

As the polyamide resin, polyamide resins described in "Polyamide Resin Handbook" (edited by Osamu Fukumoto, THE NIKKANKOGYO SHIMBUN LTD.) are mentioned. Among these, in particular, as the polyamide resin, from the viewpoint of preventing contamination of the surface layer, an alcohol-soluble polyamide is preferable, an alkoxymethylated polyamide (alkoxymethylated nylon) is more preferably mentioned, and a methoxymethylated polyamide (methoxymethylated nylon) is even more preferably mentioned.

In addition, the resin may have a crosslinked structure from the viewpoint of improving a mechanical strength of the surface layer and preventing generation of cracks in the surface layer.

In addition, the surface layer may contain particles for the purpose of controlling surface properties of the charging member or the like. Examples of the particles include inorganic particles such as silica and alumina, and resin particles such as polyamide resin particles, fluororesin particles, and silicone resin particles.

As the particles, from the viewpoint of the surface properties of the charging member, resin particles are preferably mentioned, and polyamide resin particles are more preferably mentioned. In addition, as the polyamide resin in the polyamide resin particles, those described above are preferably mentioned.

In addition, particles other than the conductive particles may be used alone, or two or more thereof may be used in combination.

The resin particles such as polyamide resin particles contained in the surface layer preferably have an average primary particle diameter of 3 μm to 10 μm from the viewpoint of excellent dispersibility in a binder resin.

A content of the resin particles such as polyamide resin particles in the surface layer is preferably 3 parts by weight to 50 parts by weight, and more preferably 10 parts by weight to 30 parts by weight or less, with respect to 100 parts by weight of the binder resin.

Examples of other additives include well-known additives which may be usually added to the surface layer such as a conductive material, a filling agent, a curing agent, a vulcanizing agent, a vulcanization accelerator, an antioxidant, a surfactant, and a coupling agent.

A thickness of the surface layer is, for example, preferably 0.01 μm to 1,000 μm, and more preferably 2 μm to 100 μm.

In addition, with regard to Embodiment X, it is preferable that a thickness of the surface layer at a position of 5 mm from the axial end portion of the elastic portion in the charging member is thicker than a thickness of the surface layer at the axial center of the elastic portion.

The thickness of the surface layer is a value measured by the following method. Using a sample obtained by cutting the surface layer, 10 points of a cross section of the surface layer are measured with an electron microscope, and calculations are carried out by averaging them.

A volume resistivity of the surface layer is preferably from $10^3$ Ωcm to $10^{14}$ Ωcm.

The volume resistivity of the surface layer is a value measured by the same method as the volume resistivity of the elastic layer.

(Producing Method for Charging Member)

An example of a producing method for a charging member according to the present exemplary embodiment will be described together with an example of a producing apparatus used for the producing method. In the example of the producing method for a charging member and the example of the producing apparatus, for example, by adjusting "separation distances K, K2, and K3", "ϕ outer diameter and number of holes in breaker plate", "discharging head (die temperature)", and the like, a surface shape accuracy of the elastic layer is improved, and surface shape characteristics of the charging member are obtained.

Hereinafter, the conductive base material (shaft)" is referred to as "core metal", and the member (roll) having an elastic layer formed on the conductive base material is called "rubber roll". Then, the example of the producing method for a charging member and the example of the producing apparatus used for the producing method will be described.

—Production of Rubber Roll (Formation of Elastic Layer)—

A rubber roll producing apparatus 10 will be described with reference to FIG. 4. An arrow H in the drawing indicates an up-down direction (vertical direction) of the apparatus, and an arrow W indicates a width direction (horizontal direction) of the apparatus.

[Overall Configuration]

The rubber roll producing apparatus 10 includes an extruder 12 having a so-called crosshead die, a separator 14 disposed on a lower side of the extruder 12, and a drawer 16 disposed on a lower side of the separator 14. Furthermore, the rubber roll producing apparatus 10 includes a cutter (not shown).

[Extruder]

The extruder 12 includes a supplying section 18 for supplying unvulcanized rubber, an extruding section 20 for extruding the rubber supplied from the supplying section 18 into a cylindrical shape, and a core metal transporting section 24 for supplying a core metal 22 to a center portion of the rubber which has been extruded into a cylindrical shape from the extruding section 20.

[Supplying Section]

The supplying section 18 includes a screw 28 disposed inside a cylindrical main body portion 26, a heater (not shown) for heating the rubber in the main body portion 26, a driving motor 30 which is disposed on a side of a rear end (a base end portion) of the screw 28 of the main body portion 26 and rotatably drives the screw 28, and a breaker plate 29 disposed on a side of a front end of the screw 28 of the main body portion 26. Furthermore, a material introducing port 32 for introducing a rubber material 100 is disposed on a side of the driving motor 30 of the main body portion 26.

The supplying section 18 is configured so that the rubber material 100 (composition containing components constituting the above-mentioned elastic layer) introduced from the material introducing port 32 is kneaded by the screw 28 inside the main body portion 26 while being fed toward the extruding section 20 as an example of a discharging section.

[Extruding Section]

The extruding section 20 includes a cylindrical case 34 connected to the supplying section 18, and a tubular holding member 42 provided inside the case 34. An introducing port 102 into which the rubber material 100 supplied from the supplying section 18 is introduced is formed on a side portion of the case 34. At a lower end portion of the holding member 42, a discharging head 38 is kept, and the discharging head 38 is kept in the case 34 via the holding member 42. In the discharging head 38, a discharging port 104 for downwardly discharging the rubber material 100 which is introduced into the extruding section 20 is formed.

The holding member 42 inside the case 34 in the extruding section 20 supports a mandrel 36 as an example of a cylindrical flow path forming portion in a state where the mandrel 36 is inserted. The mandrel 36 is kept in the case 34 via the holding member 42. A top surface member 106 for fixing the mandrel 36 is provided on the upper portion of the case 34. An annular flow path 44 through which the rubber material 100 annularly flows is formed between an outer peripheral surface of the mandrel 36 and an inner peripheral surface 42A of the holding member 42.

Here, in the annular flow path 44, for example, in a case where a volume of the rubber material 100 supplied to the extruding section 20 by the supplying section 18 per minute is V, a volume of all flow paths constituting the annular flow path 44 of the rubber material 100 formed in the extruding section 20 is set to be 5 V to 10 V. The respective flow paths will be described in detail while describing the mandrel 36.

[Mandrel]

A passing hole 46 through which the core metal 22 is inserted and passes is formed at a center portion of the mandrel 36. In addition, a portion at a lower side of the mandrel 36 exhibits a tapered shape toward a front end positioned on a side of the discharging port 104 in a state where the mandrel 36 is attached to the extruding section 20 (hereinafter also referred to as "set state of the mandrel 36"). A region on a lower side of a front end of the mandrel 36 is a merging region 48 where the core metal 22 supplied from the passing hole 46 and the rubber material 100 supplied from the annular flow path 44 merge. That is, the rubber material 100 is extruded into a cylindrical shape toward the merging region 48, and the core metal 22 is delivered into a center portion of the rubber material 100 extruded into a cylindrical shape.

As shown in FIGS. 4 to 9, the mandrel 36 has a disk-shaped base portion 110 supported in a state of being surrounded by the case 34, a base end portion 112 extending toward a front end from the base portion 110, and a front end portion 114 extending toward a front end from the base end portion 112.

Figure 7:
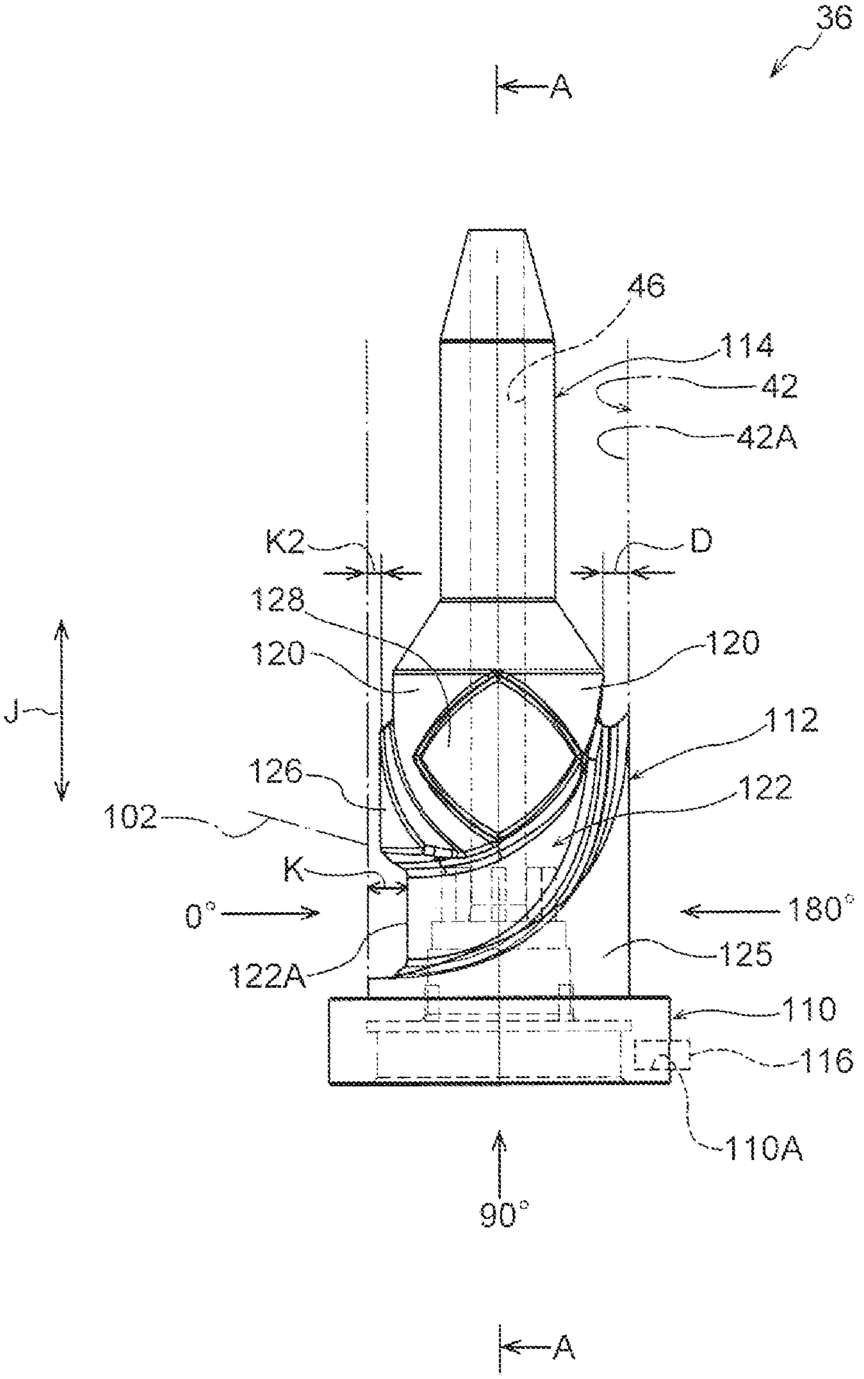
FIG. 7 is a right side view showing the mandrel as an example of a flow path forming portion.

A bottomed circular hole 110A is formed in a predetermined place on a side surface of the base portion 110. As shown in FIG. 7, the circular hole 110A is configured so that a positioning pin 116 may be inserted in a protruded state. By setting the positioning pin 116 to comply with a positioning groove (not shown) provided in the extruding section 20, an attachment position of the mandrel 36 in the circumferential direction with respect to the extruding section 20 is determined.

The base end portion 112 is formed in a cylindrical shape which has a smaller diameter than the base portion 110 and through a center portion of which the passing hole 46 (see FIG. 9) penetrates. As shown in FIGS. 5 to 8, on an outer peripheral surface of the base end portion 112, a reference surface 120 that forms a flow path (annular flow path 44) of the rubber material 100 is formed between the outer peripheral surface of the base end portion 112 and an inner peripheral surface 42A of the holding member 42.

Figure 5:
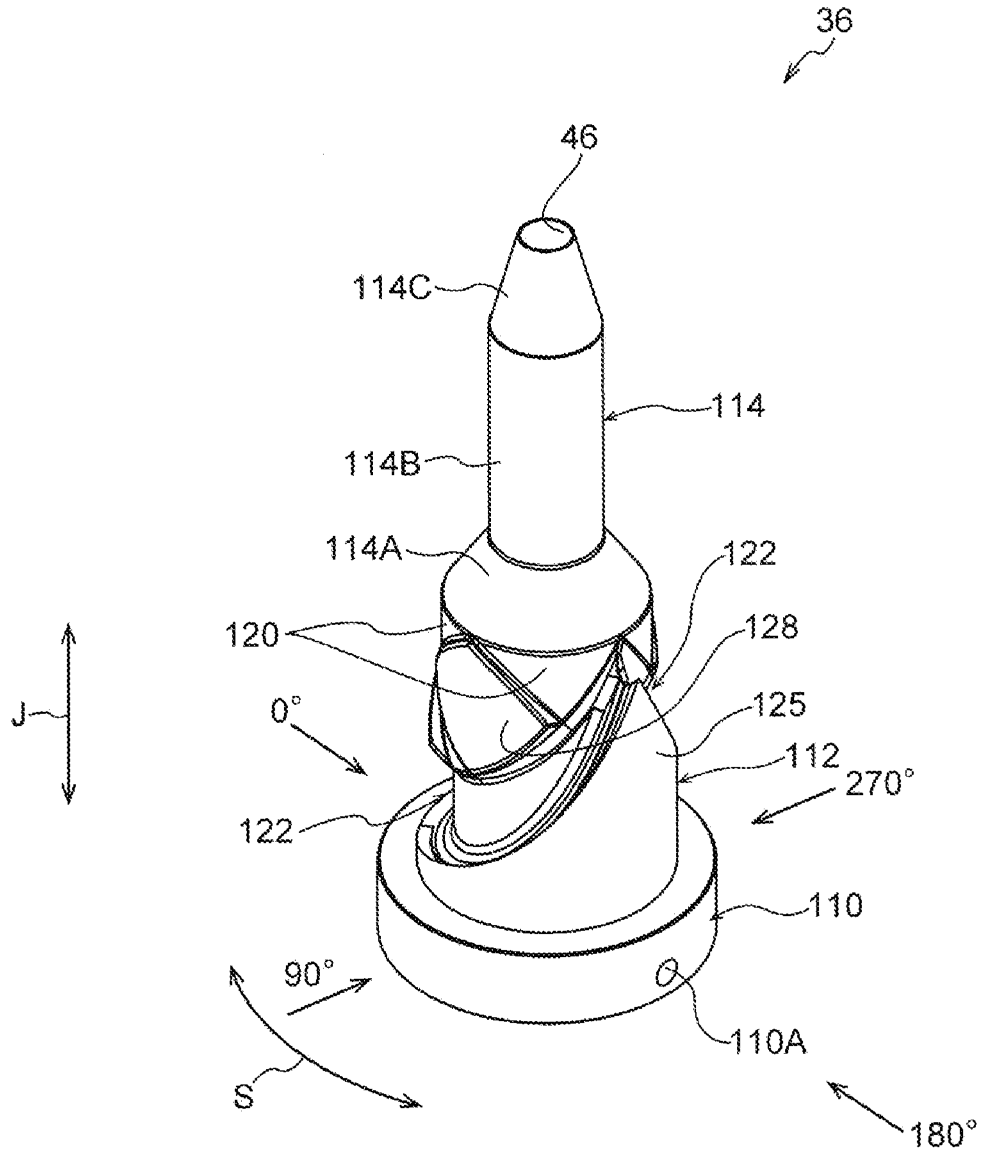
FIG. 5 is a perspective view showing a mandrel as an example of a flow path forming portion.

As shown in FIGS. 5 and 7 in the set state of the mandrel 36, in the base end portion 112, in a case where a position in a circumferential direction S of the reference surface 120 opposed to the introducing port 102 in an axial direction J of the extruding section 20 is 0°, grooves 122 extending from the 0° position to a 180° position are formed on both sides in the circumferential direction S. The circular hole 110A is provided in the base portion 110 at the 180° position.

Figure 6:
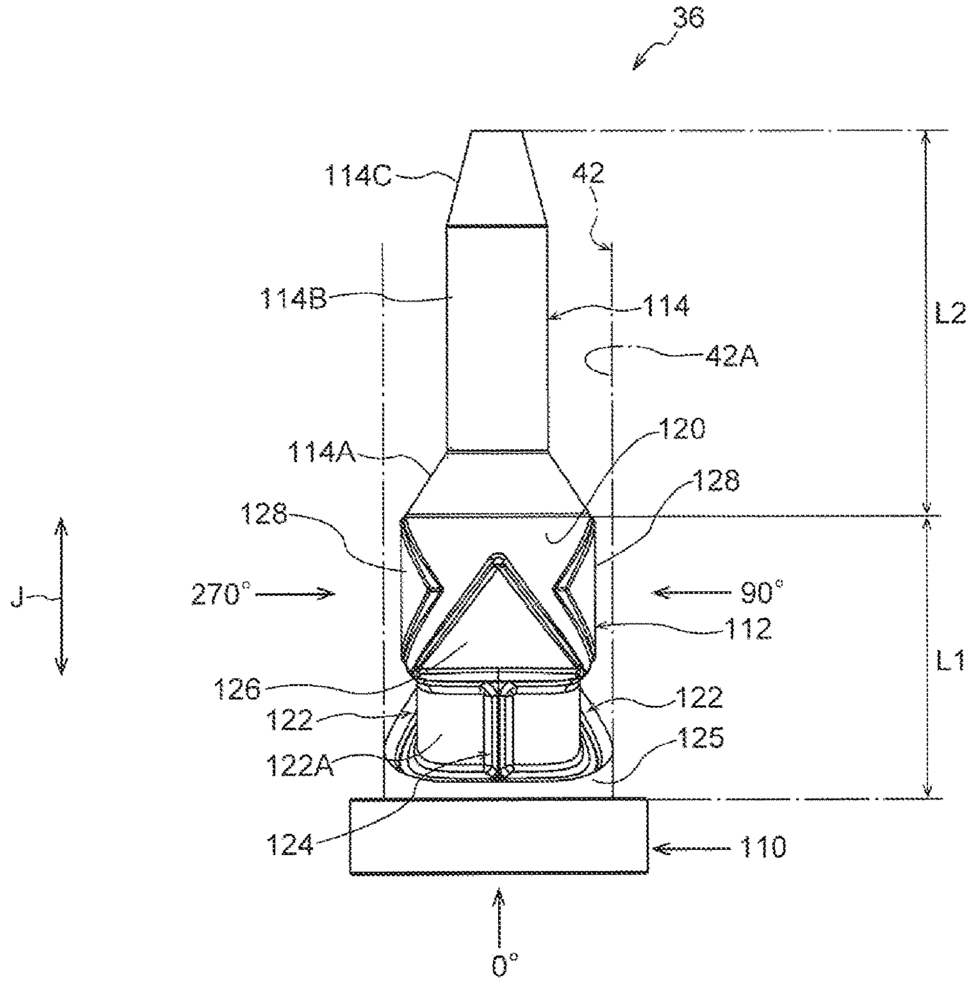
FIG. 6 is a front view showing the mandrel as an example of a flow path forming portion.
Figure 8:
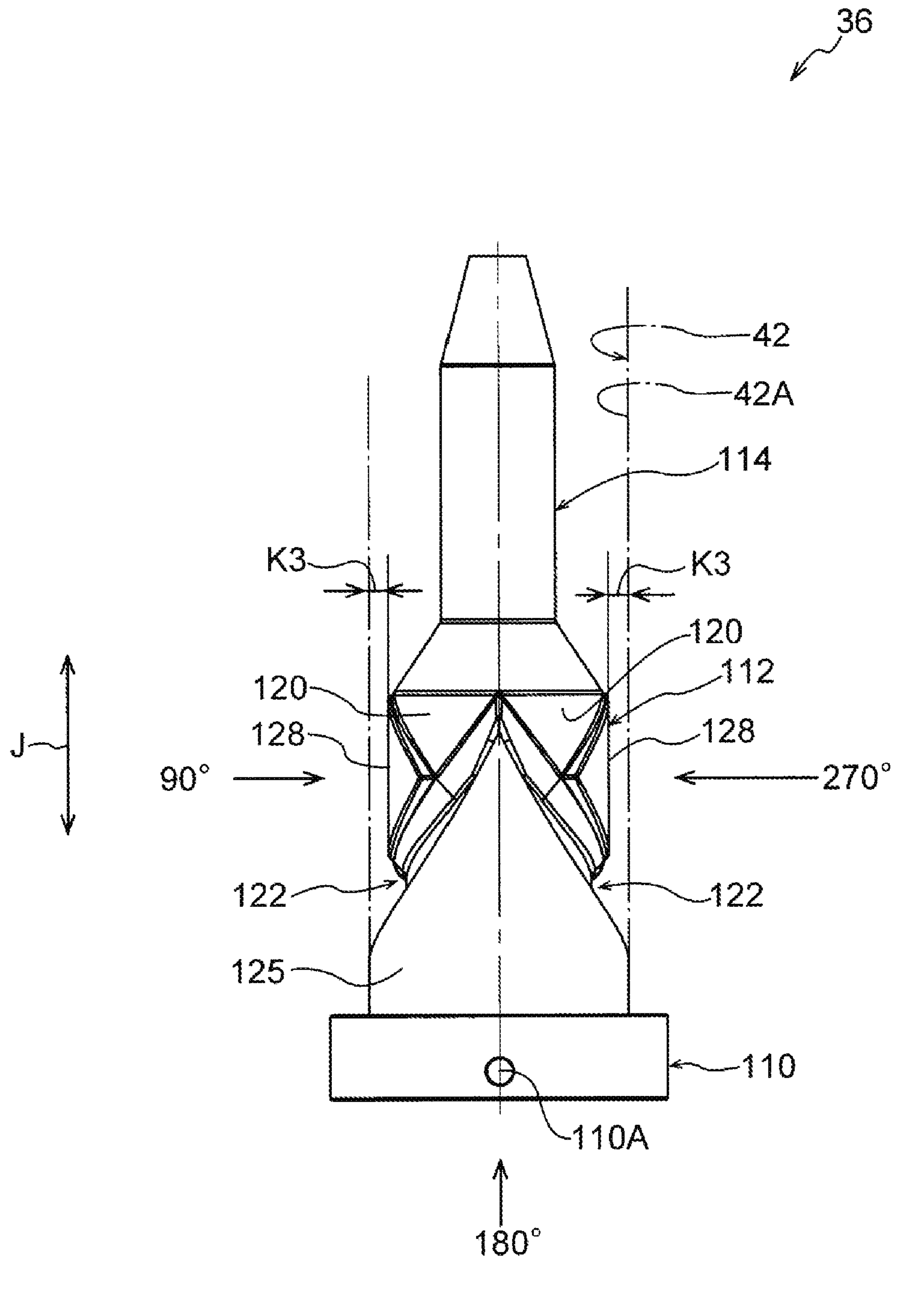
FIG. 8 is a rear view showing the mandrel as an example of a flow path forming portion.
Figure 9:
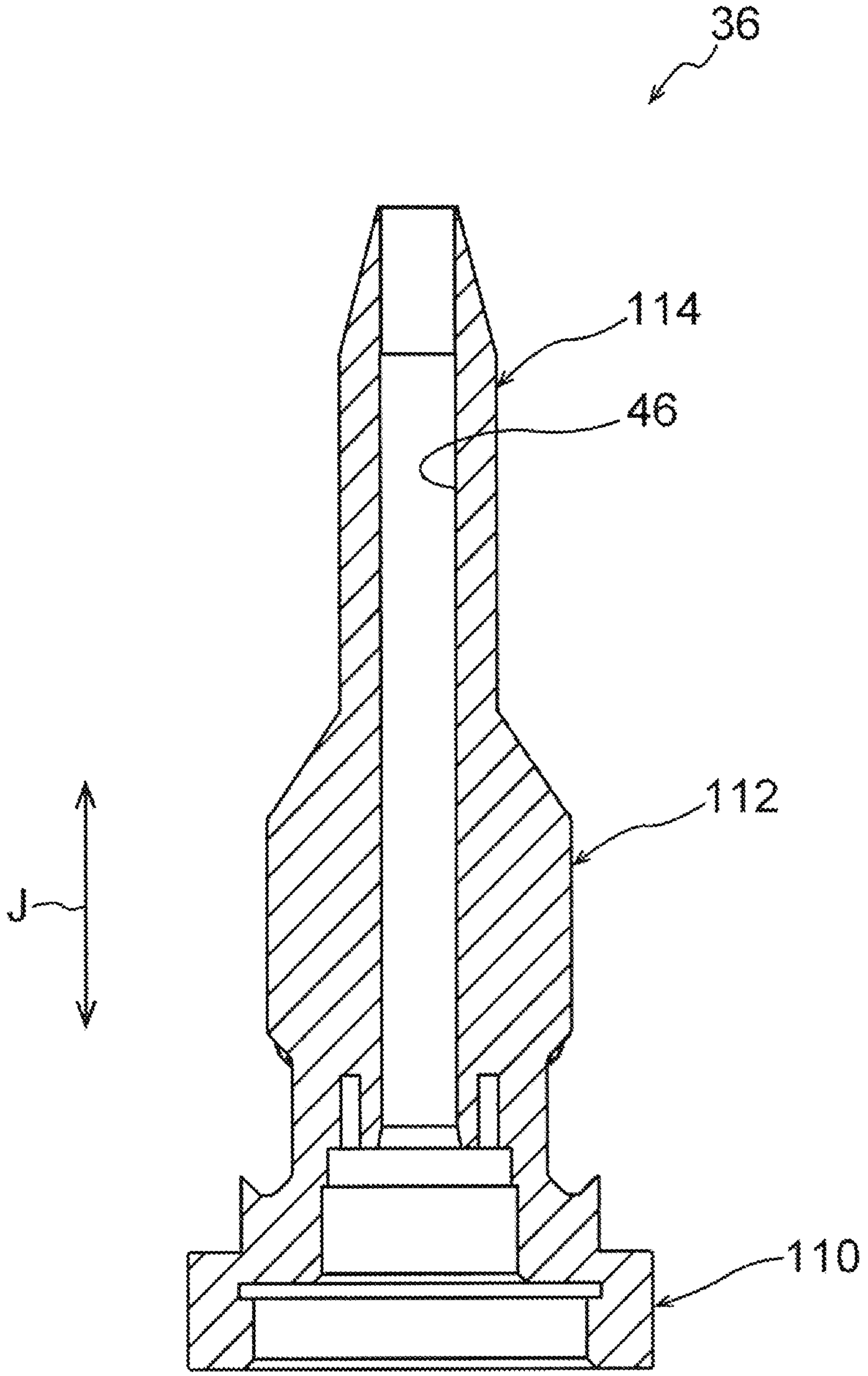
FIG. 9 is a cross-sectional view taken along a line A-A in FIG. 7.

Each of the grooves 122 is inclined from the base end of the mandrel 36 toward the front end as it goes from the 0° position to the 180° position. As shown in FIGS. 5 and 8, front ends of the respective grooves 122 are connected to each other at the 180° position. As shown in FIG. 6, in a groove bottom 122A of each groove 122, a ridge 124 protruded in a mountain shape is formed in a groove width direction at the 0° position. As a result, the rubber material 100 introduced from the introducing port 102 may flow by being distributed into the left and right grooves 122 with the ridge 124 as a boundary.

As shown in FIG. 7, in each groove 122, in a case where a separation distance from the reference surface 120 to the inner peripheral surface 42A of the holding member 42 is D, a separation distance K from the groove bottom 122A to the inner peripheral surface 42A is set to be within a range of 1.1 D to 1.5 D.

A thick portion 125 protruding from the reference surface 120 is formed between each groove 122 and the base portion 110. As a result, in a state where the mandrel 36 is inserted into the holding member 42 of the extruding section 20, the thick portion 125 is fitted in a state of being in close contact with the inner peripheral surface 42A of the holding member 42.

As shown in FIG. 6, an inlet projection surface 126 as an example of a projection surface within a range of at least 0°±10° is formed in a region of the reference surface 120 positioned on a side of a front end of each groove 122. The inlet projection surface 126 protrudes in a triangular shape having an apex on a side of the front end of the mandrel 36 as viewed from the 0° direction. As shown in FIG. 7, a separation distance K2 from the inlet projection surface 126 to the inner peripheral surface 42A is set to be 0.5 D to 0.9 D.

In addition, as shown in FIGS. 6 and 7, in the region of the reference surface 120 positioned on a side of a front end of each groove 122, a side projection surface 128 as an example of a projection surface is formed within a range of at least 90°±10° and within a range of at least 270°±10°. The side projection surface 128 is formed in a rectangular shape as viewed from the 90° direction and the 270° direction, in which one side of the rectangular shape is disposed along the groove 122, and corner portions opposed to each other are disposed so as to face the front end and the base end. As shown in FIG. 8, a separation distance K3 from the side projection surface 128 to the inner peripheral surface 42A is set to be 0.5 D to 0.9 D. The reference surface 120 is present between the inlet projection surface 126 and the side projection surface 128, and on front ends of the inlet projection surface 126 and the side projection surface 128.

As a result, as shown in FIG. 7, a flow path having the separation distance K along each groove 122, and a flow path having the separation distance K2 along the inlet projection surface 126 are formed between the base end portion 112 of the mandrel 36 and the inner peripheral surface 42A of the holding member 42 of the extruding section 20. In addition, as shown in FIGS. 7 and 8, a flow path having the separation distance K3 along the side projection surface 128 and a flow path having the separation distance D along the reference surface 120 are formed between the base end portion 112 and the inner peripheral surface 42A.

As shown in FIGS. 5 and 6, the front end portion 114 is formed in a cylindrical shape which has a smaller diameter than the base end portion 112 and through a center portion of which the passing hole 46 (see FIG. 9) penetrates, and in a shape which is rotationally symmetric about an axis. The front end portion 114 has a base end reduced diameter portion 114A which is provided on a side of the base end portion 112 and is reduced in diameter as it goes toward the front end, a cylindrical portion 114B extending toward the front end from the base end reduced diameter portion 114A, and a front end reduced diameter portion 114C which is reduced in diameter as it goes from the cylindrical portion 114B toward the front end.

As shown in FIG. 6, an axial length of the front end portion 114 is set so that a length ratio L1:L2 falls within a range of 3:7 to 5:5, where L1 is an axial length of the base end portion 112, and L2 is a length of the front end portion 114. That is, (length L1 of base end portion 112)/(length L2 of front end portion 114) is set to be 3/7 to 5/5.

[Core Metal Transporting Section]

Figure 4:
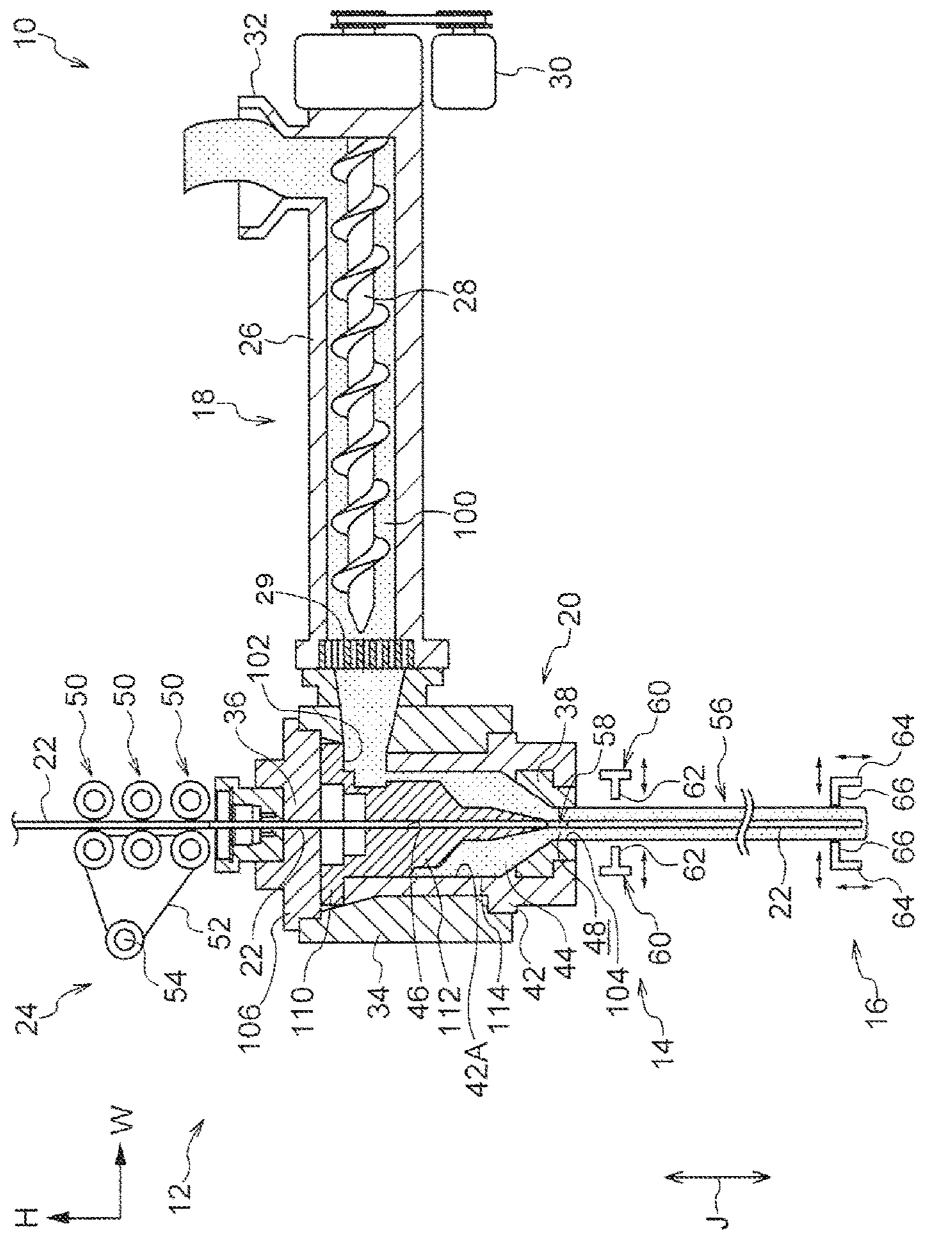
FIG. 4 is a schematic configuration diagram showing a producing apparatus for a charging member (rubber roll) according to the present exemplary embodiment.

As shown in FIG. 4, the core metal transporting section 24 includes a roller pair 50 disposed above the mandrel 36. The roller pair 50 is provided in plural pairs (for example, three pairs), and a roller at one side (the left side in the drawing) of each roller pair 50 is connected to a driving roller 54 via a belt 52. In a case where the driving roller 54 is driven, the core metal 22 sandwiched and kept between each roller pair 50 is transported toward the passing hole 46 of the mandrel 36. The core metal 22 has a predetermined length, and the core metal 22 at a rear side sent by the roller pair 50 pushes the core metal 22 at a front side present in the passing hole 46 of the mandrel 36, thereby causing plural core metals 22 to sequentially pass through the passing hole 46.

In the core metal transporting section 24, the core metal 22 is transported to a lower side in a vertical direction by each roller pair 50. Driving of the driving roller 54 that drives each roller pair 50 is temporarily stopped in a case where a front end of the core metal 22 at the front side reaches a front end of the mandrel 36. Then, in the merging region 48, the rubber material 100 is extruded into a cylindrical shape, and the core metal 22 is sequentially delivered into a center portion of the rubber material 100 at an interval. As a result, a rubber roll portion 56 in which an outer peripheral surface of the core metal 22 is covered with the rubber material 100, and a hollow portion 58 in which an interior of the rubber material 100 is hollow between the core metal 22 and the core metal 22 are alternately discharged from the discharging head 38. In order to increase adhesiveness with the rubber material 100, the outer peripheral surface of the core metal 22 may be coated with a primer (adhesive layer) in advance.

[Separator]

The separator 14 includes a pair of semicylindrical separating members 60. The pair of separating members 60 is disposed to be opposed to each other, thereby sandwiching the rubber roll portion 56 discharged from the extruder 12. Each separating member 60 has a protruding portion 62 that protrudes toward the center portion. Each separating member 60 is movable in a left-right direction in the drawing by a driving mechanism (not shown), to separate the rubber roll portion 56 on the front side and the rubber roll portion 56 on the rear side. As a result, a rubber roll member (not shown) in which the core metal 22 on the front side is in a bag shape is formed.

[Drawer]

The drawer 16 has a pair of semicylindrical gripping members 64. The pair of gripping members 64 is disposed to be opposed to each other, thereby sandwiching the rubber roll portion 56 discharged from the extruder 12. A gripping portion 66 having a shape corresponding to the outer peripheral surface shape of the rubber roll portion 56 is formed in each of the gripping member 64. Each of the gripping members 64 is configured to be movable in a left-right direction and an up-down direction by a driving mechanism (not shown).

By using the rubber roll producing apparatus 10 as described above, the bag-shaped rubber roll member is put into a vulcanization treatment furnace as necessary. As a result, the rubber material 100 covering the core metal 22 is subjected to a vulcanization treatment.

In the vulcanized rubber roll member, the rubber material 100 at both end portions is cut off so that the core metal 22 on both axial ends is exposed at a constant length. That is, the rubber material 100) at a part covering an end surface of the core metal 22 is cut off. As a result, a rubber roll (a member having an elastic layer formed on a conductive base material) is produced.

Thereafter, as necessary, a surface layer is formed on the elastic layer of the rubber roll (the member having an elastic layer formed on a conductive base material), and a charging member is obtained.

Here, the surface layer is, for example, formed as follows. The conductive base material (the outer peripheral surface of the elastic layer) is coated with a coating solution, which is obtained by dissolving or dispersing the above-mentioned respective components in a solvent, by using a dipping method, a blade coating method, a spraying method, a vacuum deposition method, a plasma coating method, or the like, and the formed coating film is dried to form the surface layer.

[Image Forming Apparatus/Charging Device/Process Cartridge]

The image forming apparatus according to the present exemplary embodiment includes an image holding member, a charging device for charging a surface of the image holding member, an exposing device for exposing the surface of the charged image holding member to form a latent image, a developing device for developing the latent image, which has been formed on the surface of the image holding member, with a toner to form a toner image, and a transferring device for transferring the toner image, which has been formed on the surface of the image holding member, onto a recording medium. As the charging device, a charging device that includes the charging member according to the present exemplary embodiment as describes above, in which the charging member is disposed in contact with a surface of the image holding member (the charging device according to the present exemplary embodiment) is applied.

On the other hand, for example, the process cartridge according to the present exemplary embodiment is detachable from the image forming apparatus having the above configuration, and includes an image holding member and a charging device for charging a surface of the image holding member. As the charging device, the charging device according to the present exemplary embodiment is applied.

As necessary, the process cartridge according to the present exemplary embodiment may, for example, include at least one selected from an exposing device for exposing the surface of the charged image holding member to form a latent image, a developing device for developing the latent image, which has been formed on the surface of the image holding member, with a toner to form a toner image, a transferring device for transferring the toner image, which has been formed on the surface of the image holding member, onto a recording medium, and a cleaning device for cleaning the surface of the image holding member.

Here, in the image forming apparatus and the process cartridge according to the present exemplary embodiment, the exposing device may preferably be an exposing device using a light emitting diode as a light source. The image holding member, the charging member, and the exposing device may preferably be integrally kept in the housing.

As the exposing device using a light emitting diode as a light source, an exposing device that includes an array of light emitting diodes in which the light emitting diodes are arranged along the axial direction of the image holding member, a mount substrate provided with a circuit for driving the light emitting diodes, and a coupling portion for imaging light from the light emitting diodes on a surface of the image holding member is exemplified.

Specifically, for example, as the exposing device, a self-scanning type LED print head that includes a light-emitting portion (light-emitting thyristor) having plural thyristor structures in which an array of light-emitting diodes and a driving part thereof are integrated, a mount substrate on which a circuit for controlling driving of the light-emitting thyristor is mounted, and a rod lens array (for example, SELFOC lens array (SELFOC is a registered trademark of Nippon Sheet Glass Co., Ltd.)) as an imaging portion is exemplified.

Next, the image forming apparatus according to the present exemplary embodiment, and the process cartridge according to the present exemplary embodiment will be described with reference to the drawings.

Figure 3:
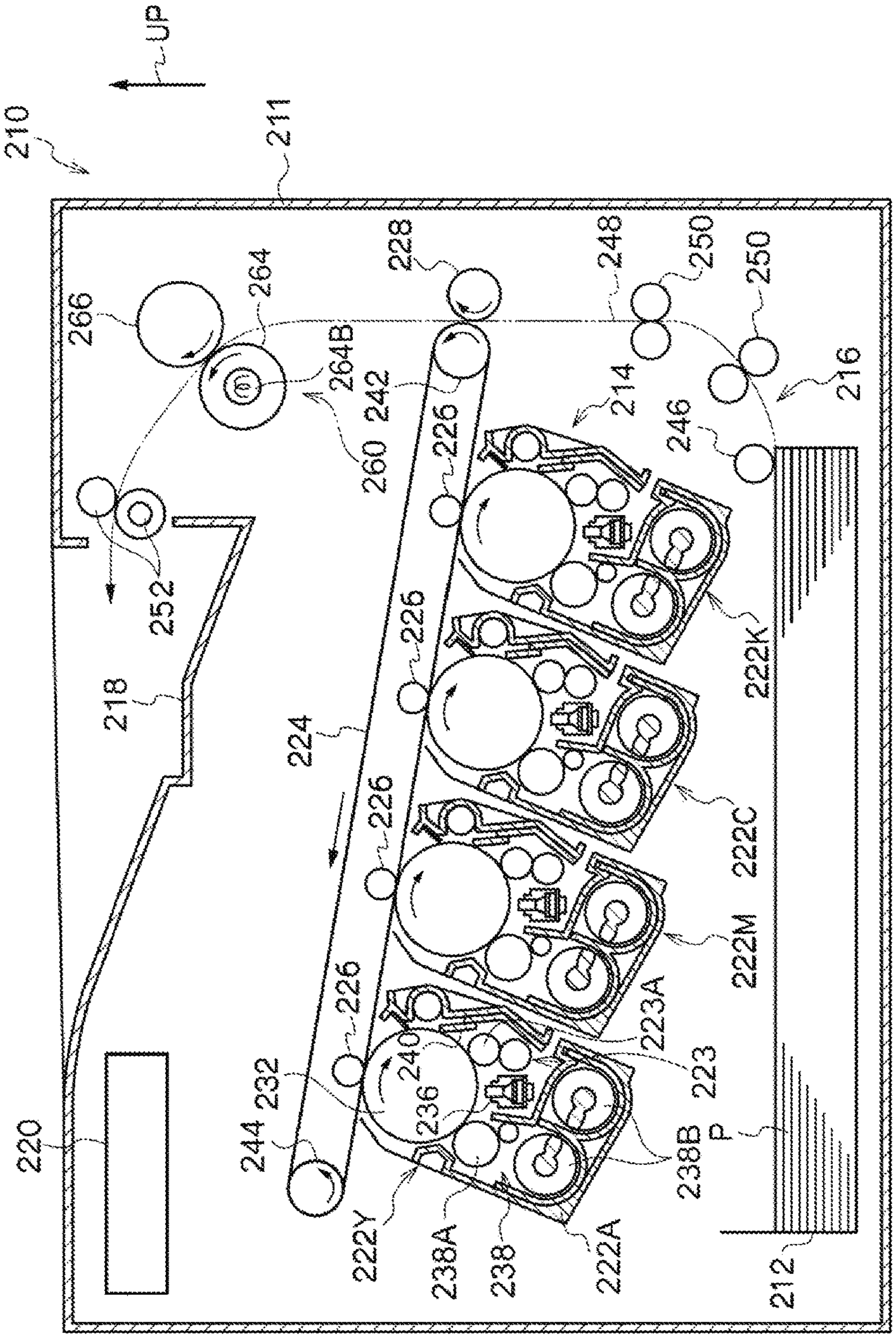
FIG. 3 is a schematic configuration diagram showing an image forming apparatus according to the present exemplary embodiment.

FIG. 3 is a schematic configuration diagram showing the image forming apparatus according to the present exemplary embodiment. An arrow UP shown in the drawing indicates an upward direction in a vertical direction.

As shown in FIG. 3, the image forming apparatus 210 includes an image forming apparatus main body 211 in which the respective components are accommodated. In an inside of the image forming apparatus main body 211, an accommodating section 212 in which a recording medium P such as paper is accommodated, an image forming section 214 for forming an image on the recording medium P, a transporting section 216 for transporting the recording medium P from the accommodating section 212 to the image forming section 214, and a controller 220 for controlling operation of each section of the image forming apparatus 210 are provided. In addition, a discharging portion 218 for discharging the recording medium P on which an image has been formed by the image forming section 214 is provided on an upper portion of the image forming apparatus main body 211.

The image forming section 214 includes image forming units 222Y, 222M, 222C, and 222K (hereinafter referred to as 222Y to 222K) that form toner images of the respective colors of yellow (Y), magenta (M), cyan (C), and black (K), an intermediate transferring belt 224 to which a toner image formed by the image forming units 222Y to 222K is transferred, a first transferring roll 226 for transferring the toner image, which has been formed by the image forming units 222Y to 222K, onto the intermediate transferring belt 224, and a second transferring roll 228 for transferring the toner image, which has been transferred onto the intermediate transferring belt 224 by the first transferring roll 226, from the intermediate transferring belt 224 to the recording medium P. The image forming section 214 is not limited to the above configuration, and may have other configurations as long as it forms an image on the recording medium P.

Here, a unit including the intermediate transferring belt 224, the first transferring roll 226, and the second transferring roll 228 corresponds to an example of a transferring device.

The image forming units 222Y to 222K are disposed side by side at a center portion in an up-down direction of the image forming apparatus 210, in a state of being inclined with respect to a horizontal direction. In addition, each of the image forming units 222Y to 222K has a photoreceptor 232 (an example of the image holding member) that rotates in one direction (for example, a clockwise direction in FIG. 3). Since the image forming units 222Y to 222K are configured in the same manner, reference numerals of the respective parts of the image forming units 222M, 222C, and 222K are omitted in FIG. 3.

In a periphery of each photoreceptor 232, a charging device 223 having a charging roll 223A that charges the photoreceptor 232, an exposing device 236 for exposing the photoreceptor 232 charged by the charging device 223 to form a latent image on the photoreceptor 232, a developing device 238 for developing the latent image, which has been formed on the photoreceptor 232 by the exposing device 236, to form a toner image, and a removing member (cleaning blade or the like) 240 that is brought into contact with the photoreceptor 232 and removes toner remaining in the photoreceptor 232 are provided in order from an upstream side in a rotational direction of the photoreceptor 232.

Here, the photoreceptor 232, the charging device 223, the exposing device 236, the developing device 238, and the removing member 240 are integrally kept by a housing 222A to form a cartridge (process cartridge).

As the exposing device 236, a self-scanning type LED print head is applied. The exposing device 236 may be an exposing device having an optical system which exposes the photoreceptor 232 via a polygon mirror from a light source.

The exposing device 236 forms a latent image based on an image signal sent from the controller 220. As the image signal sent from the controller 220, for example, there is an image signal acquired by the controller 220 from an external device.

The developing device 238 includes a developer supplying member 238A for supplying a developer to the photoreceptor 232, and plural transporting members 238B for transporting the developer imparted to the developer supplying member 238A while stirring the same.

The intermediate transferring belt 224 is formed in an annular shape and is disposed above the image forming units 222Y to 222K. Winding rolls 242 and 244 around which the intermediate transferring belt 224 is wound are provided on an inner peripheral side of the intermediate transferring belt 224. As one of the winding rolls 242 and 244 is rotationally driven, the intermediate transferring belt 224 moves in circulation (rotates) in one direction (for example, a counterclockwise direction in FIG. 3) while contacting with the photoreceptor 232. The winding roll 242 is an opposing roll that is opposed to the second transferring roll 228.

The first transferring roll 226 is opposed to the photoreceptor 232 with the intermediate transferring belt 224 being interposed therebetween. A position between the first transferring roll 226 and the photoreceptor 232 is a first transferring position where the toner image formed on the photoreceptor 232 is transferred to the intermediate transferring belt 224.

The second transferring roll 228 is opposed to the winding roll 242 with the intermediate transferring belt 224 being interposed therebetween. A position between the second transferring roll 228 and the winding roll 242 is a second transferring position where the toner image transferred to the intermediate transferring belt 224 is transferred to the recording medium P.

The transporting section 216 includes a feed roll 246 for feeding the recording medium P accommodated in the accommodating section 212, a feeding path 248 through which the recording medium P fed to the feed roll 246 is transported, and plural transporting rolls 250 which are disposed along the feeding path 248 and transport the recording medium P fed by the feed roll 246 to the second transferring position.

A fixing device 260 for fixing the toner image, which is formed on the recording medium P by the image forming section 214, to the recording medium P is provided on a downstream side of the second transferring position in a transporting direction.

The fixing device 260 includes a heating roll 264 for heating the image on the recording medium P and a pressing roll 266 as an example of a pressing member. A heating source 264B is provided in an inside of the heating roll 264.

A discharging roll 252 for discharging the recording medium P, on which the toner image is fixed, to the discharging portion 218 is provided on a downstream side of the fixing device 260 in a transporting direction.

Next, in the image forming apparatus 210, an image forming operation for forming an image on the recording medium P will be described.

In the image forming apparatus 210, the recording medium P fed by the feed roll 246 from the accommodating section 212 is delivered to the second transferring position by the plural transporting rolls 250.

On the other hand, in the image forming units 222Y to 222K, the photoreceptor 232 charged by the charging device 223 is exposed by the exposing device 236, and a latent image is formed on the photoreceptor 232. The latent image is developed by the developing device 238, and a toner image is formed on the photoreceptor 232. The toner images of the respective colors formed by the image forming units 222Y to 222K are superimposed on the intermediate transferring belt 224 at the first transferring position to form a color image. Then, the color image formed on the intermediate transferring belt 224 is transferred to the recording medium P at the second transferring position.

The recording medium P onto which the toner image is transferred is transported to the fixing device 260, and the transferred toner image is fixed by the fixing device 260. The recording medium P on which the toner image has been fixed is discharged to the discharging portion 218 by the discharging roll 252. As described above, a series of image forming operations are carried out.

The image forming apparatus 210 according to the present exemplary embodiment is not limited to the above configuration, and, for example, a well-known image forming apparatus such as an image forming apparatus using a direct transfer system in which the toner images formed on the respective photoreceptors 232 of the image forming units 222Y to 222K are directly transferred to the recording medium P may be adopted.

EXAMPLES

Hereinafter, the present invention will be described in more detail based on examples. However, the present invention is not limited by the following examples. Unless otherwise specified, "parts" means "parts by weight".

Example 1

(Formation of Elastic Layer)

An elastic layer is prepared by using "60 mm single-screw bent rubber extruder" manufactured by MITSUBA MFGCO., LTD. which corresponds to the rubber roll producing apparatus shown in FIGS. 4 to 9. Specifically, a core metal made of SUS303 having a diameter of 8 mm and a length of 330 mm is prepared. A rubber material having the following composition is extruded into a cylindrical shape from an extruding section of the rubber roll producing apparatus having the following settings. The core metal is supplied into a center portion of the extruded rubber material, and an outer peripheral surface of the core metal is covered with the cylindrical rubber material. Then, an unvulcanized rubber roll in which the outer peripheral surface of the core metal is covered with the rubber material is vulcanized at 160° C. for 60 minutes by an air heating furnace. As a result, a rubber roll (elastic layer) having an outer diameter of 12.00 mm in which the outer peripheral surface of the core metal (conductive base material) is covered with the vulcanized rubber material (elastic layer) is obtained.

—Rubber Material—

Rubber: 100 parts by weight of epichlorohydrin rubber (trade name: EPION 301, company name: OSAKA SODA), processing aid: 1 part by weight of stearic acid (trade name: TSUBAKI, company name: NOF CORPORATION), carbon black: 6 parts by weight (trade name: 3030B, company name: MITSUBISHI CHEMICAL CORPORATION).

calcium carbonate: 40 parts by weight (trade name: Viscoexcel-30, company name: SHIRAISHI KOGYO CO., LTD.), plasticizer: 3 parts by weight of paraffin oil (trade name: DB02, company name: OSAKA SODA).

vulcanizing agent: 2 parts by weight (trade name: SANFEL R, company name: SANSHIN CHEMICAL INDUSTRY CO., LTD.), vulcanization accelerator 1: 2.5 parts by weight (trade name: NOCCELER DM, company name: OUCHI SHINKO CHEMICAL INDUSTRY CO., LTD.), vulcanization accelerator 2: 1 part by weight (trade name: NOCCELER TET, company name: OUCHI SHINKO CHEMICAL INDUSTRY CO., LTD.), 5 parts by weight of vulcanization aid (trade name: ZINC OXIDE TYPE II, company name: SEIDO CHEMICAL INDUSTRY CO., LTD.).

A rubber material obtained by blending the above-mentioned components is knead using a closed type kneader and a roll machine, and an unvulcanized rubber material is obtained.

—Condition for Rubber Roll Producing Apparatus—

—Basic Condition—

Cylindrical main body portion (cylinder): length Ls=1,200 mm, inside diameter ID=60 mm, Ls/ID=20

Screw rotation speed: 16 rpm

Extrusion pressure: 23 MPa

Core metal: entire length of 350 mm, outer diameter of ϕ8.0 mm

Discharging head diameter (die diameter): ϕ12.5 mm

Mandrel (see FIGS. 4 to 9): Separation distance K2 from the inlet projection surface 126 of the mandrel 36 to the inner peripheral surface 42A=0.6 Dmm, separation distance K3 from the side projection surface 128 to the inner peripheral surface 42A=0.8 Dmm, separation distance K from the groove bottom 122A of the groove 122 to the inner peripheral surface 42A=1.2 Dmm. L1:L2 which is a ratio of a length L1 of the base end portion 112 of the mandrel 36 to a length L2 of the front end portion 114=4:6

Breaker plate: outer diameter of hole of ϕ1.3 mm, 60 holes

Discharging head temperature (die temperature): 90° C.

—Condition for Control of Outer Diameter—

The elastic layer is formed by changing feed rates of the core metal transporting member part and the gripping member so that V1/V2=1.0167, where V1 is a core metal feeding rate when a position corresponding to a rubber end portion of the charging member passes through the discharging head, and V2 is a core metal feeding rate when a position corresponding to an axial center portion of the charging member passes through the discharging head.

(Formation of Surface Layer)

Binder resin: 100 parts by weight (N-Methoxymethylated Nylon, Trade Name FR-101, Manufactured by NAMARIICHI CO., LTD.)

Particle A: 15 parts by weight (Carbon Black, Trade Name: MONARCH 1000, Manufactured by CABOT CORPORATION)

Particle B: 20 parts by weight (Polyamide Resin Particles, POLYAMIDE 12, Manufactured by ARKEMA)

Additive: 1 part by weight (Dimethyl Polysiloxane, BYK-307, Manufactured by ALTANA CORPORATION)

A mixture having the above composition is diluted with methanol and dispersed in a beads mill to obtain a dispersion. The obtained dispersion is used to dip-coat a surface of the obtained rubber roll. Thereafter, heating and drying are carried out at 130° C. for 30 minutes to form a surface layer having a thickness of 10 μm. Furthermore, top-coating with the dispersion is carried out in a range of 7 mm from each axial rubber end portion of the rubber roll (i.e., the dip-coated rubber roll is further subjected to top-coating with the same dispersion only with respect to portions of 0 to 7 mm from each of the two end portions of the rubber roll in the axial direction), so that a surface layer having a thickness of 50 μm is further provided in the above-mentioned range. As a result, a charging member of Example 1 is obtained.

Example 2

A charging member of Example 2 is obtained in the same manner as in Example 1, except that the thickness of the surface layer provided by top-coating of the dispersion in the range of 7 mm from each axial rubber end portion of the rubber roll is changed from 50 μm to 25 μm.

Example 3

A charging member of Example 3 is obtained in the same manner as in Example 1, except that top-coating of the dispersion is not carried out in the range of 7 mm from each axial rubber end portion of the rubber roll.

Example 4

A charging member of Example 4 is obtained in the same manner as in Example 3, except that a molding condition for the elastic layer is set to be V1/V2=1.0083.

Example 5

A charging member of Example 5 is obtained in the same manner as in Example 1, except that V2'/V2=0.9916 and V1/V2'=1.0336 are satisfied, where V2' is a core metal feeding rate when a position corresponding to an axial center portion of the charging member passes through the discharging head.

Example 6

A charging member of Example 6 is obtained in the same manner as in Example 3, except that the thickness of the surface layer is 60 μm over the entire region of the rubber roll.

Comparative Example 1

A charging member of Comparative Example 1 is obtained in the same manner as in Example 3, except that the molding condition for the elastic layer is set to be V1/V2=0.9917.

Comparative Example 2

A charging member of Comparative Example 2 is obtained in the same manner as in Example 3, except that the molding condition for the elastic layer is set to be V 1/V2=1.0.

<Evaluation>

For the charging member obtained in each of the examples, the following evaluation is carried out. The results are shown in Table 1.

(Measurement Method for Outer Diameter of Charging Member)

An outer diameter Re of the charging member at a position of 5 mm from the axial end portion of the elastic portion and the maximum value Rc of the outer diameter of the charging member at the axial center of the elastic portion are measured by a light-shielding type laser outer diameter measuring device (ROLL 2000, manufactured by ASAKA RIKEN Co., Ltd.).

The measurement results are shown in Table 1.

(Specification of Surface Shape of Elastic Portion of Charging Member)

According to the method as described above, measurements are carried out for the maximum amplitude value Acc at the axial center of the elastic portion in a periodic region of 1.5 mm to 6 mm and the maximum amplitude value Ae at a position of 5 mm from the axial end portion of the elastic portion in a periodic region of 1.5 mm to 6 mm, in a case where the surface shape of the elastic portion is periodically analyzed in the circumferential direction.

The measurement results are shown in Table 1.

(Density Unevenness in Image)

The charging member obtained in each of the examples is mounted on ApeosPort-VI C7771 (apparatus in which a photoreceptor, a charging member, a self-scanning type LED print head as an exposing device, a developing device, and a cleaning blade are integrally kept in a housing to form a cartridge) manufactured by Fuji Xerox Co., Ltd.

Then, by using this apparatus, an image is printed under a condition of A3 size P paper (manufactured by Fuji Xerox Co., Ltd.), black and white mode, entire surface halftone, and image density of 60%, and grade of generation of density unevenness in the image is evaluated. The grade evaluation is carried out from G0 to G5 in increments of 0.5. Smaller G indicates a smaller degree of generation of density unevenness. An allowable grade of density unevenness is G3.5.

The evaluation results are shown in Table 1.

TABLE 1

| | Re (mm) | Rc (mm) | Acc (μm) | Ae (μm) | Ae/ Acc | Grade of density unevenness |
|---|---|---|---|---|---|---|
| Example 1 | 12.3 | 12.0 | 0.66 | 0.51 | 0.77 | G2.5 |
| Example 2 | 12.25 | 12.0 | 0.66 | 0.59 | 0.89 | G3 |
| Example 3 | 12.2 | 12.0 | 0.66 | 0.66 | 1.0 | G3 |
| Example 4 | 12.1 | 12.0 | 0.66 | 0.66 | 1.0 | G3.5 |
| Example 5 | 12.3 | 11.9 | 0.66 | 0.51 | 0.77 | G2.5 |
| Example 6 | 12.3 | 12.1 | 0.51 | 0.51 | 1.0 | G3 |
| Comparative Example 1 | 11.9 | 12.0 | 0.66 | 0.66 | 1.0 | G4 |
| Comparative Example 2 | 12.0 | 12.0 | 0.66 | 0.66 | 1.0 | G4 |

From the above results, it is found that the charging members of these example exhibit prevention of generation of density unevenness in the obtained image, as compared with the charging members of the comparative examples.

Example 1A (Formation of Elastic Layer)

An elastic layer is prepared by using "60 mm single-screw bent rubber extruder" manufactured by MITSUBA MFGCO., LTD. which corresponds to the rubber roll producing apparatus shown in FIGS. 4 to 9. Specifically, a core metal made of SUS303 and having a diameter of 8 mm and a length of 330 mm is prepared. A rubber material having the following composition is extruded into a cylindrical shape from an extruding section of the rubber roll producing apparatus having the following settings. The core metal is supplied into a center portion of the extruded rubber material, and an outer peripheral surface of the core metal is covered with the cylindrical rubber material. By superimposing an amplitude of 1% of 40 Hz/rotation speed with respect to rotational driving of the core metal feed roll for supplying the core metal, a minute periodic change is applied to a core metal feed speed, and the core metal is coated with the rubber material. Then, an unvulcanized rubber roll in which the outer peripheral surface of the core metal is covered with the rubber material is vulcanized at 160° C. for 60 minutes by an air heating furnace. As a result, a rubber roll (elastic layer) having an outer diameter of 12.00 mm in which the outer peripheral surface of the core metal (conductive base material) is covered with the vulcanized rubber material (elastic layer) is obtained.

—Rubber Material—

Rubber: 100 parts by weight of epichlorohydrin rubber (trade name: EPION 301, company name: OSAKA SODA), processing aid: 1 part by weight of stearic acid (trade name: TSUBAKI, company name: NOF CORPORATION).

carbon black: 6 parts by weight (trade name: 3030B, company name: MITSUBISHI CHEMICAL CORPORATION), calcium carbonate: 40 parts by weight (trade name: Viscoexcel-30, company name: SHIRAISHI KOGYO CO., LTD.), plasticizer: 3 parts by weight of paraffin oil (trade name: DB02, company name: OSAKA SODA), vulcanizing agent: 2 parts by weight (trade name: SANFEL R, company name: SANSHIN CHEMICAL INDUSTRY CO., LTD.), vulcanization accelerator 1: 2.5 parts by weight (trade name: NOCCELER DM, company name: OUCHI SHINKO CHEMICAL INDUSTRY CO., LTD.), vulcanization accelerator 2: 1 part by weight (trade name: NOCCELER TET, company name: OUCHI SHINKO CHEMICAL INDUSTRY CO., LTD.), 5 parts by weight of vulcanization aid (trade name: ZINC OXIDE TYPE II, company name: SEIDO CHEMICAL INDUSTRY CO., LTD.). A rubber material obtained by blending the above-mentioned components is knead using a closed type kneader and a roll machine, and an unvulcanized rubber material is obtained.

—Condition for Rubber Roll Producing Apparatus—

—Basic Condition—

Cylindrical main body portion (cylinder): length Ls=1,200 mm, inside diameter ID=60 mm, Ls/ID=20

Screw rotation speed: 16 rpm

Extrusion pressure: 23 MPa

Core metal: entire length of 350 mm, outer diameter of ϕ8.0 mm

Discharging head diameter (die diameter): ϕ12.5 mm

Mandrel (see FIGS. 4 to 9): Separation distance K2 from the inlet projection surface 126 of the mandrel 36 to the inner peripheral surface 42A=0.6 Dmm, separation distance K3 from the side projection surface 128 to the inner peripheral surface 42A=0.8 Dmm, separation distance K from the groove bottom 122A of the groove 122 to the inner peripheral surface 42A=1.2 Dmm, L1:L2 which is a ratio of a length L1 of the base end portion 112 of the mandrel 36 to a length L2 of the front end portion 114=4:6

Breaker plate: outer diameter of hole of ϕ1.3 mm, 60 holes

Discharging head temperature (die temperature): 90° C.

(Formation of Surface Layer)

Binder resin: 100 parts by weight (N-Methoxymethylated Nylon, Trade Name FR-101, Manufactured by NAMARIICHI CO., LTD.)

Particle A: 15 parts by weight (Carbon Black, Trade Name: MONARCH 1000, Manufactured by CABOT CORPORATION)

Particle B: 20 parts by weight (Polyamide Resin Particles, POLYAMIDE 12, Manufactured by ARKEMA)

Additive: 1 part by weight (Dimethyl polysiloxane, BYK-307, manufactured by ALTANA CORPORATION) A mixture having the above composition is diluted with methanol and dispersed in a beads mill to obtain a dispersion. The obtained dispersion is used to dip-coat a surface of the obtained rubber roll. Thereafter, heating and drying are carried out at 130° C. for 30 minutes to form a surface layer having a thickness of 9 μm. As a result, the charging member of Example 1A is obtained.

Example 2A

A charging member of Example 2A is obtained in the same manner as in Example 1A, except that the molding condition for the elastic layer is set so that an amplitude of 0.8% of 40 Hzlrotation speed is superimposed.

Example 3A

A charging member of Example 3A is obtained in the same manner as in Example 1A, except that the molding condition for the elastic layer is set so that an amplitude of 0.5% of 40 Hzlrotation speed is superimposed.

Example 4A

A charging member of Example 4A is obtained in the same manner as in Example 1A, except that the molding condition for the elastic layer is set so that an amplitude of 1% of 40 Hzlrotation speed is superimposed, and a temperature of the extruder (discharging head temperature of the mandrel) is changed from 90° C. to 80° C.

Example 5A

A charging member of Example 5A is obtained in the same manner as in Example 1A, except that the molding condition for the elastic layer is set so that an amplitude of 1% of 40 Hz/rotation speed is superimposed, and the temperature of the extruder (discharging head temperature of the mandrel) is changed from 90° C. to 100° C.

Comparative Example 1A

A charging member of Comparative Example 1A is obtained in the same manner as in Example 1A, except that the molding condition for the elastic layer is set so that an amplitude of 0.8% of 40 Hz/rotation speed is superimposed, and a temperature of the extruder (discharging head temperature of the mandrel) is changed from 90° C. to 80° C.

Comparative Example 2A

A charging member of Comparative Example 2A is obtained in the same manner as in Example 1A, except that the molding condition for the elastic layer is set so that no amplitude is superimposed.

<Evaluation>

For the charging member obtained in each of the examples, the following evaluation is carried out. The results are shown in Table 2.

(Specification of Surface Shape of Elastic Roll of Charging Member)

According to the method as described above, measurements are carried out for the maximum amplitude value Ac in a periodic region of 1.5 mm to 6 mm in a case of periodically analyzing a surface shape of the charging member in a circumferential direction, and the maximum amplitude value Aa in a periodic region of 1.5 mm to 6 mm in a case of periodically analyzing a surface shape of the charging member in an axial direction.

The measurement results are shown in Table 2.

(Density Unevenness in Image)

The charging member obtained in each of the examples is mounted on ApeosPort-VI C7771 (apparatus in which a photoreceptor, a charging member, a self-scanning type LED print head as an exposing device, a developing device, and a cleaning blade are integrally kept in a housing to form a cartridge) manufactured by Fuji Xerox Co., Ltd.

Then, by using this apparatus, an image is printed under a condition of A3 size P paper (manufactured by Fuji Xerox Co., Ltd.), black and white mode, entire surface halftone, and image density of 60%, and grade of generation of density unevenness in the image is evaluated. The grade evaluation is carried out from G0 to G5 in increments of 0.5. Smaller G indicates a smaller degree of generation of density unevenness. An allowable grade of density unevenness is G3.5.

The evaluation results are shown in Table 2.

TABLE 2

| | Ac (μm) | Aa (μm) | Ac/Aa | Grade of density unevenness |
|---|---|---|---|---|
| Example 1A | 0.66 | 0.95 | 0.69 | G2 |
| Example 2A | 0.66 | 0.84 | 0.79 | G2.5 |
| Example 3A | 0.66 | 0.68 | 0.97 | G3 |
| Example 4A | 0.90 | 0.92 | 0.98 | G3 |
| Example 5A | 0.52 | 0.95 | 0.55 | G1 |
| Comparative Example 1A | 0.90 | 0.81 | 1.11 | G4 |
| Comparative Example 2A | 0.66 | 0.63 | 1.05 | G4 |

From the above results, it is found that the charging members of these examples exhibit prevention of generation of density unevenness in the obtained image, as compared with the charging members of the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging member comprising:

a cylindrical or columnar conductive base material; and an elastic portion provided on the conductive base material, wherein a value of an outer diameter of the charging member at a position of 5 mm from an axial end portion of the elastic portion is greater than a maximum value of an outer diameter of the charging member at an axial center of the elastic portion.

2. The charging member according to claim 1, wherein in a case of periodically analyzing a surface shape of the elastic portion in a circumferential direction, a value of a maximum amplitude value at an axial center of the elastic portion in a periodic region from 1.5 mm to 6 mm, is 0.4 μm or more.

3. The charging member according to claim 2, wherein the value of the maximum amplitude value at the axial center of the elastic portion in the periodic region from 1.5 mm to 6 mm, is from 0.4 μm to 1.0 μm.

4. The charging member according to claim 1, wherein in a case of periodically analyzing a surface shape of the elastic portion in a circumferential direction, a value of a ratio of a maximum amplitude value at a position of 5 mm from an axial end portion of the elastic portion in a periodic region from 1.5 mm to 6 mm and a maximum amplitude value at an axial center of the elastic portion in the periodic region from 1.5 mm to 6 mm, is 1.0 or less.

5. The charging member according to claim 4, wherein the value of the ratio of the maximum amplitude value at the position of 5 mm from the axial end portion of the elastic portion in the periodic region from 1.5 mm to 6 mm and the maximum amplitude value at the axial center of the elastic portion in the periodic region from 1.5 mm to 6 mm, is 0.8 or less.

6. The charging member according to claim 1, wherein in a case of periodically analyzing a surface shape of the elastic portion in a circumferential direction, a value of a maximum amplitude value at a position of 5 mm from an axial end portion of the elastic portion in a periodic region from 1.5 mm to 6 mm, is from 0.4 μm to 0.8 μm.

7. The charging member according to claim 6, wherein the value of the maximum amplitude value at the position of 5 mm from the axial end portion of the elastic portion in the periodic region from 1.5 mm to 6 mm, is from 0.4 μm to 0.7 μm.

8. The charging member according to claim 1, wherein a difference between the value of the outer diameter of the charging member at the position of 5 mm from the axial end portion of the elastic portion and the value of the maximum value of the outer diameter of the charging member at the axial center of the elastic portion is from 0.05 mm to 0.5 mm.

9. The charging member according to claim 8, wherein the difference between the value of the outer diameter of the charging member at the position of 5 mm from the axial end portion of the elastic portion and the value of the maximum value of the outer diameter of the charging member at the axial center of the elastic portion is from 0.25 mm to 0.5 mm.

10. A charging device comprising the charging member according to claim 1.

11. A process cartridge, comprising:

an image holding member; and a charging device configured to charge a surface of the image holding member, wherein the charging device includes the charging member according to claim 1, the charging member being disposed in contact with the surface of the image holding member, and wherein the process cartridge is detachable from an image forming apparatus.

12. An image forming apparatus, comprising:

an image holding member;

a charging device configured to charge a surface of the image holding member, wherein the charging device includes the charging member according to claim 1, the charging member being disposed in contact with the surface of the image holding member;

an exposing device configured to expose the surface of the charged image holding member to form a latent image;

a developing device configured to develop the latent image, which has been formed on the surface of the image holding member, with a toner to form a toner image; and a transferring device configured to transfer the toner image, which has been formed on the surface of the image holding member, onto a recording medium.

13. A cylindrical or columnar charging member, wherein a ratio of a value of a maximum amplitude value in a periodic region from 1.5 mm to 6 mm in a case of periodically analyzing a surface shape of the charging member in a circumferential direction and a maximum amplitude value in the periodic region from 1.5 mm to 6 mm in a case of periodically analyzing a surface shape of the charging member in an axial direction, is 1.0 or less.

14. The charging member according to claim 13, wherein the ratio of the value of the maximum amplitude value in the periodic region from 1.5 mm to 6 mm in the case of periodically analyzing the surface shape of the charging member in the circumferential direction and the maximum amplitude value in the periodic region from 1.5 mm to 6 mm in the case of periodically analyzing the surface shape of the charging member in the axial direction, is 0.8 or less.

15. The charging member according to claim 14, wherein the ratio of the value of the maximum amplitude value in the periodic region from 1.5 mm to 6 mm in the case of periodically analyzing the surface shape of the charging member in the circumferential direction and the maximum amplitude value in the periodic region from 1.5 mm to 6 mm in the case of periodically analyzing the surface shape of the charging member in the axial direction, is 0.7 or less.

16. The charging member according to claim 13, wherein a value of the maximum amplitude value in the periodic region from 1.5 mm to 6 mm in the case of periodically analyzing the surface shape of the charging member in the circumferential direction, is from 0.2 μm to 1.0 μm.

17. The charging member according to claim 16, wherein the value of the maximum amplitude value in the periodic region from 1.5 mm to 6 mm in the case of periodically analyzing the surface shape of the charging member in the circumferential direction, is from 0.4 μm to 0.8 μm.

18. The charging member according to claim 13, wherein a value of the maximum amplitude value in the periodic region from 1.5 mm to 6 mm in the case of periodically analyzing the surface shape of the charging member in the axial direction, is from 0.3 μm to 1.1 μm.

19. The charging member according to claim 18, wherein the value of the maximum amplitude value in the periodic region from 1.5 mm to 6 mm in the case of periodically analyzing the surface shape of the charging member in the axial direction, is from 0.7 μm to 1.0 μm.

20. A charging device comprising the charging member according to claim 13.

21. A process cartridge, comprising:

an image holding member; and a charging device configured to charge a surface of the image holding member, wherein the charging device includes the charging member according to claim 13, the charging member being disposed in contact with the surface of the image holding member, and wherein the process cartridge is detachable from an image forming apparatus.

22. An image forming apparatus, comprising:

an image holding member;

a charging device configured to charge a surface of the image holding member, wherein the charging device includes the charging member according to claim 13, the charging member being disposed in contact with the surface of the image holding member;

an exposing device configured to expose the surface of the charged image holding member to form a latent image;

a developing device configured to develop the latent image, which has been formed on the surface of the image holding member, with a toner to form a toner image; and a transferring device configured to transfer the toner image, which has been formed on the surface of the image holding member, onto a recording medium.

* * * * *